(12) United States Patent
Jatti et al.

(10) Patent No.: US 11,496,727 B2
(45) Date of Patent: Nov. 8, 2022

(54) STREAMING TO DISPLAY ARRAY

(71) Applicant: ARRIS Enterprises LLC, Suwanee, GA (US)

(72) Inventors: Vinod Jatti, Bangalore (IN); William P. Franks, San Diego, CA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/240,066

(22) Filed: Apr. 26, 2021

(65) Prior Publication Data

US 2022/0053180 A1 Feb. 17, 2022

Related U.S. Application Data

(60) Provisional application No. 63/064,186, filed on Aug. 11, 2020.

(51) Int. Cl.
*H04N 13/398* (2018.01)
*H04N 9/82* (2006.01)
*H04N 19/597* (2014.01)
*H04N 19/70* (2014.01)

(52) U.S. Cl.
CPC ......... *H04N 13/398* (2018.05); *H04N 9/8205* (2013.01); *H04N 19/597* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2012/0246218 A1* | 9/2012 | Adimatyam | H04N 21/2343 709/203 |
| 2017/0115947 A1* | 4/2017 | Velicescu | G09G 3/32 |

* cited by examiner

*Primary Examiner* — Christopher Braniff
(74) *Attorney, Agent, or Firm* — Wenderoth, Lind & Ponack, L.L.P.

(57) ABSTRACT

Aspects of the present invention are drawn to a server device for use with a stream of encoded A/V data and an n×m array of client devices. The server device includes a memory and a processor. The memory causes the server device to decode the A/V data to gain access to decoded video data and decoded audio data, as well as determining the configuration of the n×m array of client devices. The memory causes the server device to separate the decoded video data into n times m distinct video data payloads and encode n times m converted streams of encoded A/V data. The memory additionally causes the server device to transmit the n times m encoded subdivided streams to the n×m array of client devices, respectively, based on the determined configuration of the n×m array of client devices.

36 Claims, 12 Drawing Sheets

STREAMING TO DISPLAY ARRAY

BACKGROUND

Embodiments of the invention relate to streaming data to an array of client devices.

SUMMARY

Aspects of the present invention are drawn to a server device for use with a stream of encoded audio/video (A/V) data and an n×m array of client devices, n being a first positive integer, m being a second positive integer. Each client device is configured to display a respective display content, and at least one of the n×m array of client devices is configured to play audio content. The server device includes a memory and a processor configured to execute instructions stored on the memory to cause the server device to receive the stream of encoded A/V data. The memory also causes the server device to decode the A/V data to gain access to decoded video data and decoded audio data, as well as determining the configuration of the n×m array of client devices. The memory causes the server device to separate the decoded video data into n times m distinct video data payloads and encode n times m converted streams of encoded A/V data, each converted stream including a respective one of the n times m distinct video data payloads. The memory additionally causes the server device to transmit the n times m encoded subdivided streams to the n×m array of client devices, respectively, based on the determined configuration of the n×m array of client devices.

In some embodiments, the processor is further configured to execute instructions stored on the memory to additionally cause the server device to remove, when encoding the n times m converted streams of encoded A/V data, the audio packet from all but one of the n times m converted streams of encoded A/V data.

In some embodiments, the processor is further configured to execute instructions stored on the memory to additionally cause the server device to transmit an instruction, to all but one of the n×m array of client devices, to not play audio data.

In some embodiments, the server device further includes an eye tracking system configured to generate an arrangement signal by tracking a gaze of a user amongst the n×m array of client devices. The processor is further configured to execute instructions stored on the memory to additionally cause the server device to transmit n times m encoded formation identification streams to the n×m array of client devices, respectively. The processor is also configured to execute instructions stored on the memory to additionally cause the server device to determine the configuration of the n×m array of client devices based on the arrangement signal. Each n times m encoded formation identification stream is configured to instruct a respective one of the n×m array of client devices to display an image to lead the gaze of the user.

In some embodiments, the server device further includes a microphone configured to generate an arrangement signal wherein the processor is further configured to execute instructions stored on the memory to additionally cause the server device to transmit n times m encoded formation identification streams to the n×m array of client devices, respectively. The processor is further configured to execute instructions stored on the memory to additionally cause the server device to determine the configuration of the n×m array of client devices based on the arrangement signal. Each time n times m encoded formation identification stream is configured to instruct a respective one of the n×m array of client devices to display an image prompting a respective vocal response by the user, and the arrangement signal is based on the sum of the vocal responses by the user.

In some embodiments, the server device further includes a user interface configured to generate an arrangement signal. The processor is further configured to execute instructions stored on the memory to additionally cause the server device to transmit n times m encoded formation identification streams to the n×m array of client devices, respectively. The processor is further configured to execute instructions stored on the memory to additionally cause the server device to determine the configuration of the n×m array of client devices based on the arrangement signal. Each n times m encoded formation identification stream is configured to instruct a respective one of the n×m array of client devices to display an image prompting a respective user interface response by the user via the user interface. The arrangement signal is based on the sum of the user interface responses by the user via the user interface.

Other aspects of the present disclosure are drawn to a method of using a server device with a stream of encoded A/V data and an n×m array of client devices, n being a first positive integer, m being a second positive integer. Each client device is configured to display a respective display content, and at least one of the n×m array of client devices is configured to play audio content. The method includes receiving, via a processor configured to execute instructions stored on a memory, the stream of encoded A/V data. The method also includes decoding, via the processor, the A/V data to gain access to decoded video data and decoded audio data. The method further includes determining, via the processor, the configuration of the n×m array of client devices as well as separating, via the processor, the decoded video data into n times m distinct video data payloads. The method additionally includes encoding, via the processor, n times m converted streams of encoded A/V data, each converted stream including a respective one of the n times m distinct video data payloads. The method also includes transmitting, via the processor, the n times m encoded converted streams to the n×m array of client devices, respectively, based on the determined configuration of the n×m array of client devices.

In some embodiments, the method further includes removing, via the processor and when encoding the n times m converted streams of encoded A/V data, the audio packet from all but one of the n times m converted streams of encoded A/V data.

In some embodiments, the method further includes transmitting, via the processor, an instruction, to all but one of the n×m array of client devices, to not play audio data.

In some embodiments, the method further includes generating, via an eye tracking system, an arrangement signal by tracking a gaze of a user amongst the n×m array of client devices. The method also includes transmitting, via the processor, n times m encoded formation identification streams to the n×m array of client devices, respectively and determining, via the processor, the configuration of the n×m array of client devices based on the arrangement signal. Each n times m encoded formation identification stream is configured to instruct a respective one of the n×m array of client devices to display an image to lead the gaze of the user.

In some embodiments, the method further includes generating, via a microphone, an arrangement signal and transmitting, via the processor, n times m encoded formation identification streams to the n×m array of client devices, respectively. The method also includes determining, via the processor, the configuration of the n×m array of client devices based on the arrangement signal. Each n times m encoded formation identification stream is configured to instruct a respective one of the n×m array of client devices to display an image prompting a respective vocal response by the user, and the arrangement signal is based on the sum of the vocal responses by the user.

In some embodiments, the method further includes generating, via a user interface an arrangement signal and transmitting, via the processor, n times m encoded formation identification streams to the n×m array of client devices, respectively. The method also includes determining, via the processor, the configuration of the n×m array of client devices based on the arrangement signal. Each n times m encoded formation identification stream is configured to instruct a respective one of the n×m array of client devices to display an image prompting a respective user interface response by the user via the user interface. The arrangement signal is based on the sum of the user interface responses by the user via the user interface.

Other aspects of the present disclosure are drawn to a non-transitory, computer-readable media having computer-readable instructions stored thereon, the computer-readable instructions being capable of being read by a server device with a stream of encoded A/V data and an n×m array of client devices, n being a first positive integer, m being a second positive integer. Each client device is configured to display a respective display content, and at least one of the n×m array of client devices is configured to play audio content. The computer-readable instructions are capable of instructing the server device to perform the method including receiving, via a processor configured to execute instructions stored on a memory, the stream of encoded A/V data. The method also includes decoding, via the processor, the A/V data to gain access to decoded video data and decoded audio data as well as determining, via the processor, the configuration of the n×m array of client devices. The method further includes separating, via the processor, the decoded video data into n times m distinct video data payloads and encoding, via the processor, n times m converted streams of encoded A/V data, each converted stream including a respective one of the n times m distinct video data payloads. The method also includes transmitting, via the processor, the n times m encoded converted streams to the n×m array of client devices, respectively, based on the determined configuration of the n×m array of client devices.

In some embodiments, the non-transitory, computer-readable media wherein the computer-readable instructions are capable of instructing the server device to perform the method further includes removing, via the processor and when encoding the n times m converted streams of encoded A/V data, the audio packet from all but one of the n times m converted streams of encoded A/V data.

In some embodiments, the non-transitory, computer-readable media wherein the computer-readable instructions are capable of instructing the server device to perform the method further includes transmitting, via the processor, an instruction, to all but one of the n×m array of client devices, to not play audio data.

In some embodiments, the non-transitory, computer-readable media wherein the computer-readable instructions are capable of instructing the server device to perform the method further includes generating, via an eye tracking system, an arrangement signal by tracking a gaze of a user amongst the n×m array of client devices. The method also includes transmitting, via the processor, n times m encoded formation identification streams to the n×m array of client devices, respectively. The method further includes determining, via the processor, the configuration of the n×m array of client devices based on the arrangement signal. Each n times m encoded formation identification stream is configured to instruct a respective one of the n×m array of client devices to display an image to lead the gaze of the user.

In some embodiments, the non-transitory, computer-readable media wherein the computer-readable instructions are capable of instructing the server device to perform the method further includes generating, via a microphone, an arrangement signal and transmitting, via the processor, n times m encoded formation identification streams to the n×m array of client devices, respectively. The method also includes determining, via the processor, the configuration of the n×m array of client devices based on the arrangement signal. Each n times m encoded formation identification stream is configured to instruct a respective one of the n times m array of client devices to display an image prompting a respective vocal response by the user wherein the arrangement signal is based on the sum of the vocal responses by the user.

In some embodiments, the non-transitory, computer-readable media wherein the computer-readable instructions are capable of instructing the server device to perform the method further includes generating, via a user interface an arrangement signal and transmitting, via the processor, n times m encoded formation identification streams to the n×m array of client devices, respectively. The method also includes determining, via the processor, the configuration of the n×m array of client devices based on the arrangement signal. Each n times m encoded formation identification stream is configured to instruct a respective one of the n×m array of client devices to display an image prompting a respective user interface response by the user via the user interface wherein the arrangement signal is based on the sum of the user interface responses by the user via the user interface.

Other aspects of the present disclosure are drawn to a main client device for use with a stream of encoded A/V data and a plurality of client devices, the main client device and the plurality of client devices being configured in an n×m array of client devices, n being a first positive integer, m being a second positive integer, each client device being configured to display a respective display content, the main client device including a memory having menu data stored therein. The main client device also includes a processor configured to execute instructions stored on the memory to cause the main client device to receive the stream of encoded A/V data and decode the A/V data to gain access to decoded video data and decoded audio data. The main client device also determines the configuration of the n×m array of client devices and separates the decoded video data into n times m distinct video data payloads. The main client device further encodes n times m converted streams of encoded A/V data, each converted stream including a respective one of the n times m distinct video data payloads and transmits (n×m)−1 encoded converted streams to the plurality of client devices, respectively, based on the determined configuration of the n×m array of client devices.

In some embodiments, the main client device wherein the processor is further configured to execute instructions stored on the memory to additionally cause the main client device to remove, when encoding the n times m converted streams of encoded A/V data, the audio packet from all of the (n×m)−1 encoded converted streams of encoded A/V data.

In some embodiments, the main client device wherein the processor is further configured to execute instructions stored on the memory to additionally cause the main client device to transmit an instruction, to all of the plurality of client devices, to not play audio data.

In some embodiments, the main client device further includes an eye tracking system configured to generate an arrangement signal by tracking a gaze of a user amongst the n×m array of client devices. The processor is further configured to execute instructions stored on the memory to additionally cause the main client device to transmit (n×m)−1 encoded formation identification streams to the plurality of client devices, respectively as well as determine the configuration of the n×m array of client devices based on the arrangement signal. Each n times m encoded formation identification stream is configured to instruct a respective one of the n×m array of client devices to display an image to lead the gaze of the user.

In some embodiments, the main client device further includes a microphone configured to generate an arrangement signal wherein the processor is further configured to execute instructions stored on the memory. This additionally causes the main client device to transmit n times m encoded formation identification streams to the n×m array of client devices, respectively, and determine the configuration of the n×m array of client devices based on the arrangement signal. Each n times m encoded formation identification stream is configured to instruct a respective one of the n×m array of client devices to display an image prompting a respective vocal response by the user. The arrangement signal is based on the sum of the vocal responses by the user.

In some embodiments, the main client device further includes a user interface configured to generate an arrangement signal wherein the processor is further configured to execute instructions stored on the memory. This additionally causes the main client device to transmit n times m encoded formation identification streams to the n×m array of client devices, respectively, and determine the configuration of the n×m array of client devices based on the arrangement signal. Each n times m encoded formation identification stream is configured to instruct a respective one of the n×m array of client devices to display an image prompting a respective user interface response by the user via the user interface. The arrangement signal is based on the sum of the user interface responses by the user via the user interface.

Other aspects of the present disclosure are drawn to a method of using a main client device with a stream of encoded A/V data and a plurality of client devices. The main client device and the plurality of client devices are configured in an n×m array of client devices, n being a first positive integer, m being a second positive integer, with each client device being configured to display a respective display content. The method includes receiving, via a processor configured to execute instructions stored on a memory, the stream of encoded A/V data and decoding, via the processor, the A/V data to gain access to decoded video data and decoded audio data. The method also includes determining, via the processor, the configuration of the n×m array of client devices as well as separating, via the processor, the decoded video data into n times m distinct video data payloads. The method further includes encoding, via the processor, n times m converted streams of encoded A/V data, each converted stream including a respective one of the n times m distinct video data payloads. The method additionally includes transmitting, via the processor, (n×m)−1 encoded converted streams to the plurality of client devices, respectively, based on the determined configuration of the n×m array of client devices.

In some embodiments, the method further includes removing, via the processor, when encoding the n times m converted streams of encoded A/V data, the audio packet from all of the (n×m)−1 encoded converted streams of encoded A/V data.

In some embodiments, the method further includes transmitting, via the processor, an instruction, to all of the plurality of client devices, to not play audio data.

In some embodiments, the method further includes generating, via an eye tracking system, an arrangement signal by tracking a gaze of a user amongst the n×m array of client devices as well as transmitting, via the processor, (n×m)−1 encoded formation identification streams to the plurality of client devices, respectively. The method also includes determining, via the processor, the configuration of the n×m array of client devices based on the arrangement signal wherein each n times m encoded formation identification stream is configured to instruct a respective one of the n×m array of client devices to display an image to lead the gaze of the user.

In some embodiments, the method further includes generating, via a microphone, an arrangement signal and transmitting, via the processor, n times m encoded formation identification streams to the n×m array of client devices, respectively. The method also includes determining, via the processor, the configuration of the n×m array of client devices based on the arrangement signal. Each n times m encoded formation identification stream is configured to instruct a respective one of the n×m array of client devices to display an image prompting a respective vocal response by the user wherein the arrangement signal is based on the sum of the vocal responses by the user.

In some embodiments, the method further includes generating, via a user interface, an arrangement signal and transmitting, via the processor, n times m encoded formation identification streams to the n×m array of client devices, respectively. The method also includes determining, via the processor, the configuration of the n×m array of client devices based on the arrangement signal wherein each n times m encoded formation identification stream is configured to instruct a respective one of the n times m array of client devices to display an image prompting a respective user interface response by the user via the user interface. The arrangement signal is based on the sum of the user interface responses by the user via the user interface.

Other aspects of the present disclosure are drawn to a non-transitory, computer-readable media having computer-readable instructions stored thereon, the computer-readable instructions being capable of being read by main client device for use with a stream of encoded A/V data and a plurality of client devices. The main client device and the plurality of client devices are configured in an n×m array of client devices, n being a first positive integer, m being a second positive integer, wherein each client device is configured to display a respective display content. The computer-readable instructions are capable of instructing the main client device to perform the method including receiving, via a processor configured to execute instructions stored on a memory, the stream of encoded A/V data as well as decoding, via the processor, the A/V data to gain access to decoded video data and decoded audio data. The method further includes determining, via the processor, the configuration of the n×m array of client devices and separating, via the processor, the decoded video data into n times m distinct video data payloads. The method also includes encoding, via the processor, n times m converted streams of encoded A/V data, each converted stream including a respective one of the n times m distinct video data payloads and transmitting, via the processor, (n×m)−1 encoded converted streams to the plurality of client devices, respectively, based on the determined configuration of the n×m array of client devices.

In some embodiments, the non-transitory, computer-readable media wherein the computer-readable instructions are capable of instructing the main client device to perform the method further includes removing, via the processor, when encoding the n times m converted streams of encoded A/V data, the audio packet from all of the (n×m)−1 encoded converted streams of encoded A/V data.

In some embodiments, the non-transitory, computer-readable media wherein the computer-readable instructions are capable of instructing the main client device to perform the method further includes transmitting, via the processor, an instruction, to all of the plurality of client devices, to not play audio data.

In some embodiments, the non-transitory, computer-readable media wherein the computer-readable instructions are capable of instructing the main client device to perform the method further includes generating, via an eye tracking system, an arrangement signal by tracking a gaze of a user amongst the n×m array of client devices. The method further includes transmitting, via the processor, (n×m)−1 encoded formation identification streams to the plurality of client devices, respectively and determining, via the processor, the configuration of the n×m array of client devices based on the arrangement signal. Each n times m encoded formation identification stream is configured to instruct a respective one of the n×m array of client devices to display an image to lead the gaze of the user.

In some embodiments, the non-transitory, computer-readable media wherein the computer-readable instructions are capable of instructing the main client device to perform the method further includes generating, via a microphone, an arrangement signal as well as transmitting, via the processor, n times m encoded formation identification streams to the n×m array of client devices, respectively. The method also includes determining, via the processor, the configuration of the n×m array of client devices based on the arrangement signal. Each n times m encoded formation identification stream is configured to instruct a respective one of the n×m array of client devices to display an image prompting a respective vocal response by the user wherein the arrangement signal is based on the sum of the vocal responses by the user.

In some embodiments, the non-transitory, computer-readable media wherein the computer-readable instructions are capable of instructing the main client device to perform the method further includes generating, via a user interface, an arrangement signal and transmitting, via the processor, n times m encoded formation identification streams to the n×m array of client devices, respectively. The method further includes determining, via the processor, the configuration of the n×m array of client devices based on the arrangement signal. Each n times m encoded formation identification stream is configured to instruct a respective one of the n×m array of client devices to display an image prompting a respective user interface response by the user via the user interface wherein the arrangement signal is based on the sum of the user interface responses by the user via the user interface.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

Figure 1:
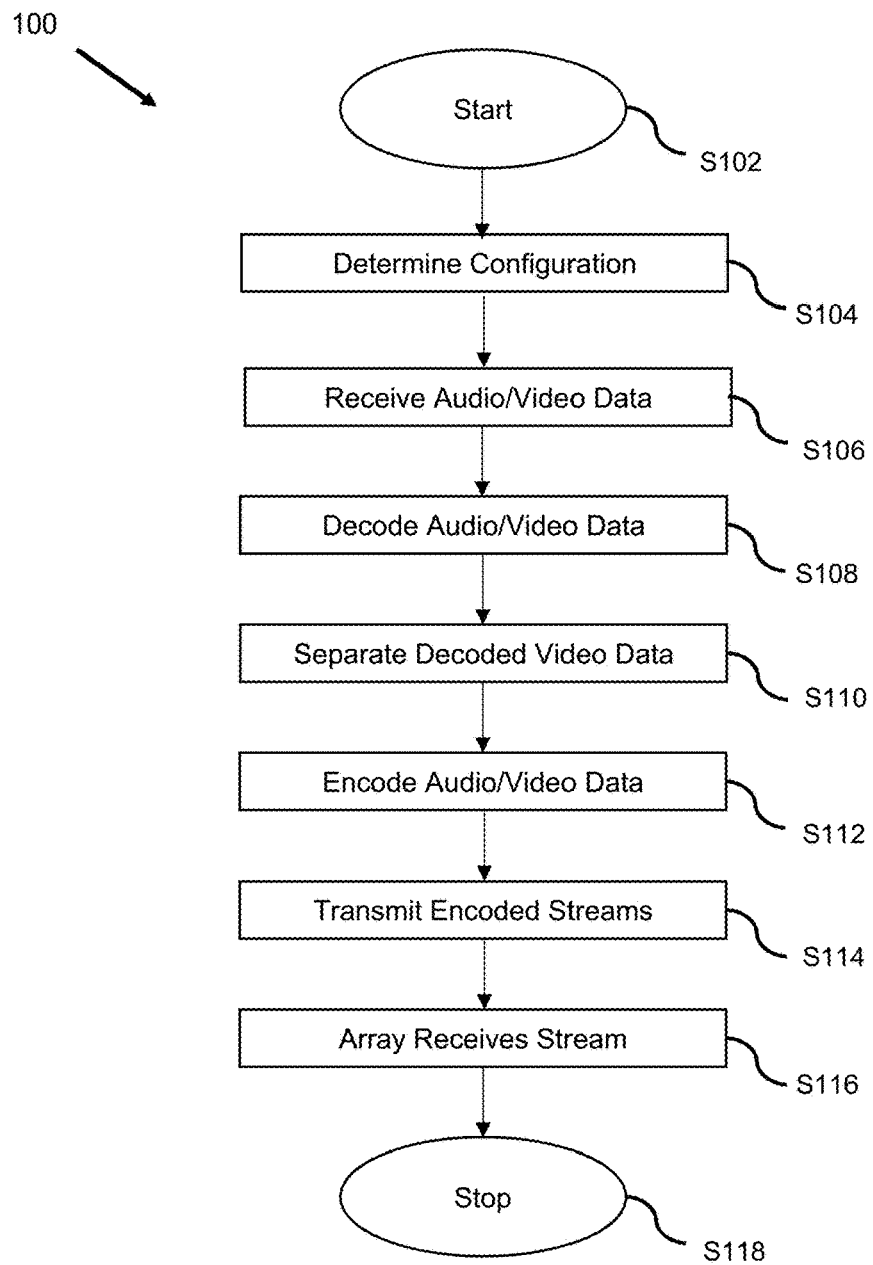
FIG. 1 illustrates an algorithm to be executed by a processor for streaming to display array in accordance with aspects of the present disclosure.

Conventionally, an array of display devices may be used to display one large image or video. However, there are problems involving the timing and distribution of the data to the array of display devices with respect to streaming content.

What is needed is a system and method for efficiently distributing A/V data to an array of client devices.

A system and method in accordance with the present disclosure enables distributing A/V data to an array of client devices efficiently.

In accordance with the present disclosure, a server identifies that multiple client devices are collocated at a single location and prompts the user to switch to 'video grid' mode of presentation. The server then breaks the received video streams into multiple segments and streams them to individual client devices.

In some embodiments, the server is responsible for maintaining a uniform group adaptive bandwidth maintenance as well as applying common group video operations like fast-forward, rewind, pause, play etc. The server additionally maintains graphics to be segmented similarly to how video would be segmented. The server also maintains an application layout or graphic user interface (GUI), which is displayed on the grid as a single whole view. Further, the server maintains audio, which is enabled on a single client device, commonly the central client device, and is muted on any additional client devices. The user can optionally connect a sound bar to any of the grid units using a high definition multi-media interface (HDMI) repeater between a client device (i.e. dongle) and the display unit. The client device may also auto detect where the user has connected a sound bar based on HDMI/high-bandwidth digital content protection (HDCP) device cascade information. In this scenario, all display units are muted and only the sound bar is active in producing audio output.

There are various existing methods of identifying grouped or collocated client devices nearby. One such example may include the case of a cloud-based server scenario, such as an over-the-top (OTT) media service, where the server is already capable of identifying the location of connected client devices. When more than one client device gets connected from the same source location, the server may prompt the user to decide whether or not to group the display in a grid fashion. Additionally, in the case of an in-home server, the clients being in Wi-Fi proximity to a single access point device (APD), or server, or all the clients being in the same subnet, in the case of a wired network, allow the server to easily identify the connected client devices in order to serve as a group display.

Other aspects of the present disclosure include a method of user controlled media stream content presentation on segmented display grids or array units. Each client device may include a universal plug and play (UPnP)/simple service discover protocol (SSDP) to discover other devices in a pre-determined range. As part of service discovery, they mutually share details such as: device model and universally unique identifier (UUID), current location, types of apps supported, registered user etc. Then the client device identifies that the devices are in proximity and prompts the user about group formation. When the user accepts this option, all of the client devices form a group. One of the client devices, in an example, the default being the device at the center of the grid, may request stream information from the server and multicast to other clients. All the other clients get information from this multicast content. With mutual coordination, each client device may display a quadrant or segment of video data as well as graphics. The server is agnostic concerning the formation of client devices and stream media to one client device.

An advantage of this approach is that all the display units are in sync while presenting video content due to all units simultaneously receiving video data and displaying a portion of it based on the device's grid number.

While working in this grid fashion, one client device handles and coordinates user interaction. This may include receiving and processing user interface such as TR remote keys, voice interaction, or eye tracking. Additionally, the same client device produces audio output, and the other units are muted. In cases involving a sound bar connection, the logic explained above is applied.

Other aspects of the present disclosure include a method of auto identification of the position of each client device. One example utilizes gaze control through camera enabled devices. This method is more applicable when the client device and display units are a single entity. Each display unit may print a name of an object such as "Car", "Tree", "Apple", etc. and ask the user to read out each of them in any fashion. When the user reads each of the words, devices can track the gaze and self-detect their position in the grid. Another example uses a user voice interface, such as for example a smart media device (SMD). This is applicable to a client device, for example one containing a dongle with mic or voice interface. As mentioned previously, each display unit prints the name of an object and asks the user to read the words starting from the top-left corner from left to right and over all rows. Each unit with a voice receiver may now identify their respective location based on the sequence number of their respective keyword. Another example is a more manual approach where the user marks the position of the client devices manually.

One benefit of streaming data to an array of client devices is that display resolutions are now increasing and streaming ultra-high definition (UHD) media content to end devices may be smoother due to technological advancement in video compression (ex: an audio video interleaved (AVI) codec being latest with higher compression ratio). Additionally, there are cost benefits regarding streaming to an array rather than one large device. A single large TV may be costlier and bulkier than smaller devices arranged in a grid fashion on the wall to achieve the same effect.

An example system and method for enabling the distribution of A/V data to an array of client devices efficiently in accordance with aspects of the present disclosure will now be described in greater detail with reference to FIGS. 1-9.

Consider, for purposes of explanation only, a situation where a client is streaming media content into their home. Rather than purchasing a single large TV, the client has chosen to purchase smaller TVs arranged in a grid fashion on the wall. Instead of streaming different media content on each device, the client wishes to have the TVs collectively present the same stream to achieve the same effect as one large TV.

FIG. 1 illustrates an algorithm 100 to be executed by a processor for streaming to display an array in accordance with aspects of the present disclosure.

As shown in the figure, algorithm 100 starts (S102), and the server determines the configuration (S104). For example, with the situation previously mentioned, consider that the client is attempting to stream a movie. As will be discussed in greater detail below, the media server would receive an input signal, including data and/or A/V content, in this example a movie, from the media provider.

Figure 2:
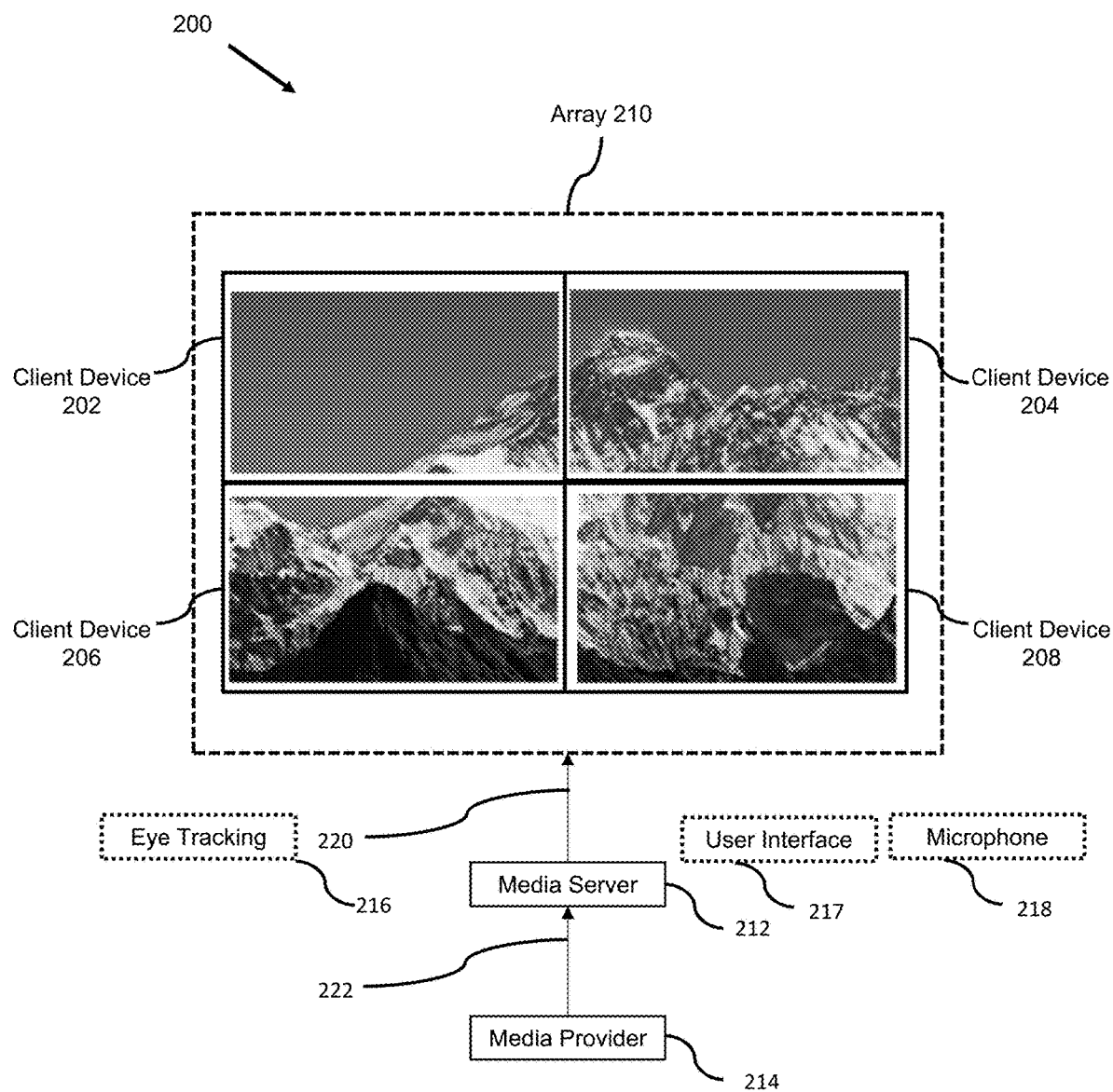
FIG. 2 illustrates a display system.

FIG. 2 illustrates a display system 200.

As shown in the figure, display system 200 includes a client device 202, a client device 204, a client device 206, a client device 208, an array 210, a media server 212, a media provider 214, an optional eye tracking system 216, an optional user interface (UI) 217, an optional microphone 218, a communication channel 220, and a communication channel 222.

Media provider 214 is configured to communicate with media server 212, and media server 212 is configured to communicate with array 210.

Figure 3:
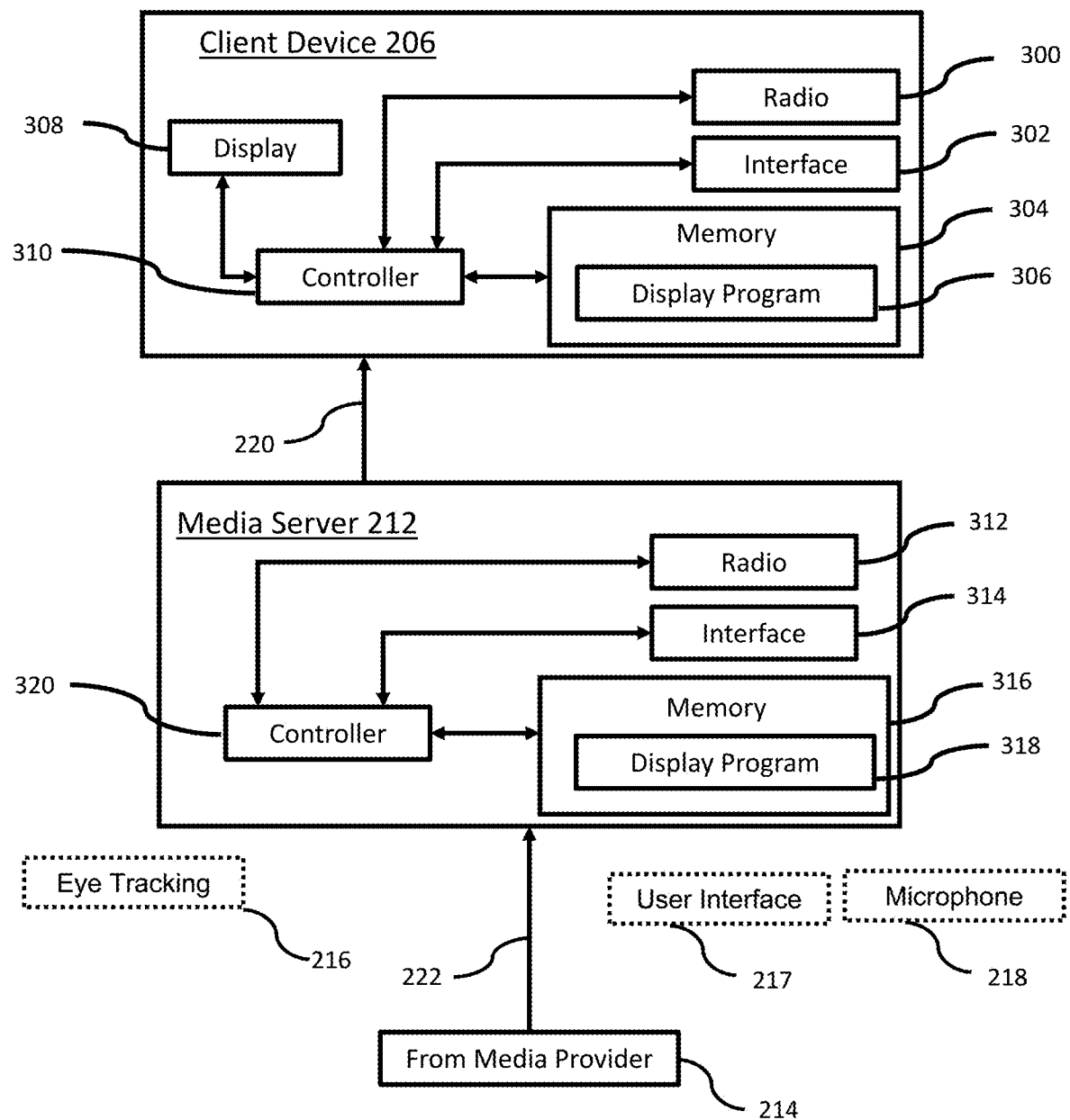
FIG. 3 illustrates an exploded view of the client device and the media server of FIG. 2.

FIG. 3 illustrates an exploded view of client device 206 and media server 212 of FIG. 2, as well an optional tracking system 216, an optional UI 217, and an optional microphone 218.

As shown in FIG. 3, media server 212 includes: a controller 320; a memory 316, which has stored therein a display program 318; and at least one radio, a sample of which is illustrated as a radio 312; and an interface 314.

In this example, controller 320, memory 316, radio 312, and interface 314 are illustrated as individual devices. However, in some embodiments, at least two of controller 320 main memory 316, radio 312, and interface 314 may be combined as a unitary device. Further, in some embodiments, at least one of controller 320 and memory 316 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 320, may be any device capable of controlling general operations of media server 212 and includes, but is not limited to, a central processing unit (CPU), a hardware microprocessor, a single core processor, a multi-core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of media server 212.

Memory 316 can store various programming, and user content, and data including display program 318. In some embodiments, as will be described in greater detail below, display program 318 includes instructions, that when executed by controller 320, enable media server 212 to: receive a stream of encoded A/V data; decode the A/V data to gain access to decoded video data and decoded audio data; determine the configuration of the client devices within array 210; separate the decoded video data into n times m distinct video data payloads, wherein in this example n and m are reach 2; encode n×m subdivided streams of encoded A/V data, each converted stream including a respective one of the n×m distinct video data payloads; and transmit the n×m encoded converted streams to the client devices within array 210, respectively, based on the determined configuration of the client devices within array 210.

Interface circuit 314 can include one or more connectors, such as RF connectors, or Ethernet connectors, and/or wireless communication circuitry, such as 5G circuitry and one or more antennas. Interface circuit 314 receives content from media provider 214 and provides content to client device 206 by known methods, non-limiting examples of which include terrestrial antenna, satellite dish, wired cable, DSL, optical fibers, or 5G as discussed above.

In some embodiments, as will be described in greater detail below, display program 318 includes instructions, that when executed by controller 320, enable media server 212 to additionally cause media server 212 to remove, when encoding the n times m converted streams of encoded A/V data, audio data from all but one of the n times m converted streams of encoded AV data.

In some embodiments, as will be described in greater detail below, display program 318 includes instructions, that when executed by controller 320, enable media server 212 to additionally cause media server 212 to transmit an instruction, to all but one of the client devices within array 210, to not play audio data.

In some embodiments, media server 212 includes eye tracking system 216 configured to generate an arrangement signal by tracking a gaze of a user amongst the client devices within array 210. Eye tracking is the process of measuring either the point of gaze (where one is looking) or the motion of an eye relative to the head. Eye tracking system 216 may be any system that is configured to measure eye positions and eye movement. In some of these embodiments, as will be described in greater detail below, display program 318 includes instructions, that when executed by controller 320, enable media server 212 to additionally cause media server 212 to transmit n×m encoded formation identification streams to the client devices within array 210, respectively, and determine the configuration of the client devices within array 210 based on the arrangement signal, wherein each n times m encoded formation identification stream is configured to instruct a respective one of the client devices within array 210 to display an image to lead a gaze of the user.

In some embodiments, media server 212 includes UI 217 configured to enable a user to generate an arrangement signal. UI 217 may be any device or system that is configured to enable a user to access and provide input to controller 320. UI 217 may include one or more layers including a human-machine interface (HMI) machines with physical input hardware such a keyboards, mice, game pads and output hardware such as computer monitors, speakers, and printers. Additional UI layers in UI 217 may interact with one or more human senses, including: tactile UI (touch), visual UI (sight), and auditory UI (sound). In some of these embodiments, as will be described in greater detail below, display program 318 includes instructions, that when executed by controller 320, enable media server 212 to additionally cause media server 212 to transmit n×m encoded formation identification streams to the client devices within array 210, respectively, and determine the configuration of the client devices of array 210 based on the arrangement signal, wherein each n×m encoded formation identification stream is configured to instruct a respect one of the client devices to display an image prompting a respective input response by the user via UI 217, and wherein the arrangement signal is based on the sum of the input responses by the user.

In some embodiments, media server 212 includes microphone 218 configured to generate an arrangement signal. In some of these embodiments, as will be described in greater detail below, display program 318 includes instructions, that when executed by controller 320, enable media server 212 to additionally cause media server 212 to transmit n×m encoded formation identification streams to the client devices within array 210, respectively, and determine the configuration of the client devices of array 210 based on the arrangement signal, wherein each n×m encoded formation identification stream is configured to instruct a respect one of the client devices to display an image prompting a respective vocal response by the user, and wherein the arrangement signal is based on the sum of the vocal responses by the user.

Radio 312, may include a Wi-Fi WLAN interface radio transceiver that is operable to communicate with client device 206, as shown in the figure and also may include a cellular transceiver operable to communicate with the media provider through communication channel 222. Radio 312 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Media server 212 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Client device 206 includes: a radio 300; an interface 302; a memory 304 which has stored therein a display program 306; a display 308; and a controller 310.

In this example, controller 310, memory 304, radio 300, and interface circuit 302 are illustrated as individual devices. However, in some embodiments, at least two of controller 310, memory 304, radio 300, and interface circuit 302 may be combined as a unitary device. Whether as individual devices or as combined devices, controller 310, memory 304, radio 300, and interface circuit 302 may be implemented as any combination of an apparatus, a system and an integrated circuit. Further, in some embodiments, at least one of controller 310, memory 304 and interface circuit 302 may be implemented as a computer having non-transitory computer-readable media for carrying or having computer-executable instructions or data structures stored thereon.

Controller 310 may be any device capable of controlling general operations of client device 206 and includes, but is not limited to, a central processing unit (CPU), a hardware microprocessor, a single core processor, a multi-core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 206.

Controller 310 can include a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the client device 206 in accordance with the embodiments described in the present disclosure.

Memory 304 can store various programming, and user content, and data including display program 306. In some embodiments, as will be described in greater detail below, display program 306 includes instructions that, when executed by controller 310, enable controller 310 to cause client device 206 to: receive a stream of encoded A/V data from media server 212; decode the A/V data to gain access to decoded video data and decoded audio data; and play the decoded A/V data. In some of these embodiments, as will be described in greater detail below, display program 306 includes additional instructions that, when executed by controller 310, enable controller 310 to cause client device 206 to: receive an additional instructions from client device 806 not to play audio data; and not play the audio data within decoded A/V data.

Interface circuit 302 can include one or more connectors, such as RF connectors, or Ethernet connectors, and/or wireless communication circuitry, such as 5G circuitry and one or more antennas. Interface circuit 302 receives content from media server 212 by known methods, non-limiting examples of which include terrestrial antenna, satellite dish, wired cable, DSL, optical fibers, or 5G as discussed above. Through interface circuit 302 media server 212 receives an input signal, including data and/or A/V content, from the media provider.

Radio 300, (and preferably two or more radios), may also be referred to as a wireless communication circuit, such as a Wi-Fi WLAN interface radio transceiver and is operable to communicate with media server 212. Radio 300 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Client device 206 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

With the situation previously mentioned, with reference to FIGS. 2 and 3, media server 212 determines the configuration of array 210. Controller 320 allows media server 212 to obtain information, from each client device indicating, where each respective client device is located relative to the others in array 210, by any known method.

In some embodiments, a known eye tracking system, is optionally shown here as eye tracking system 216. In some embodiments, eye tracking system 216 may be incorporated into media server 212. In other embodiments, eye tracking system 216 may be a separate and distinct device that media server 212 is in communication with, that is able to obtain information from eye tracking system 216.

Some non-limiting examples of media sever 212 determining the configuration of client devices within array 210 will now be described with additional reference to FIGS. 4A-D.

Figure 4A:
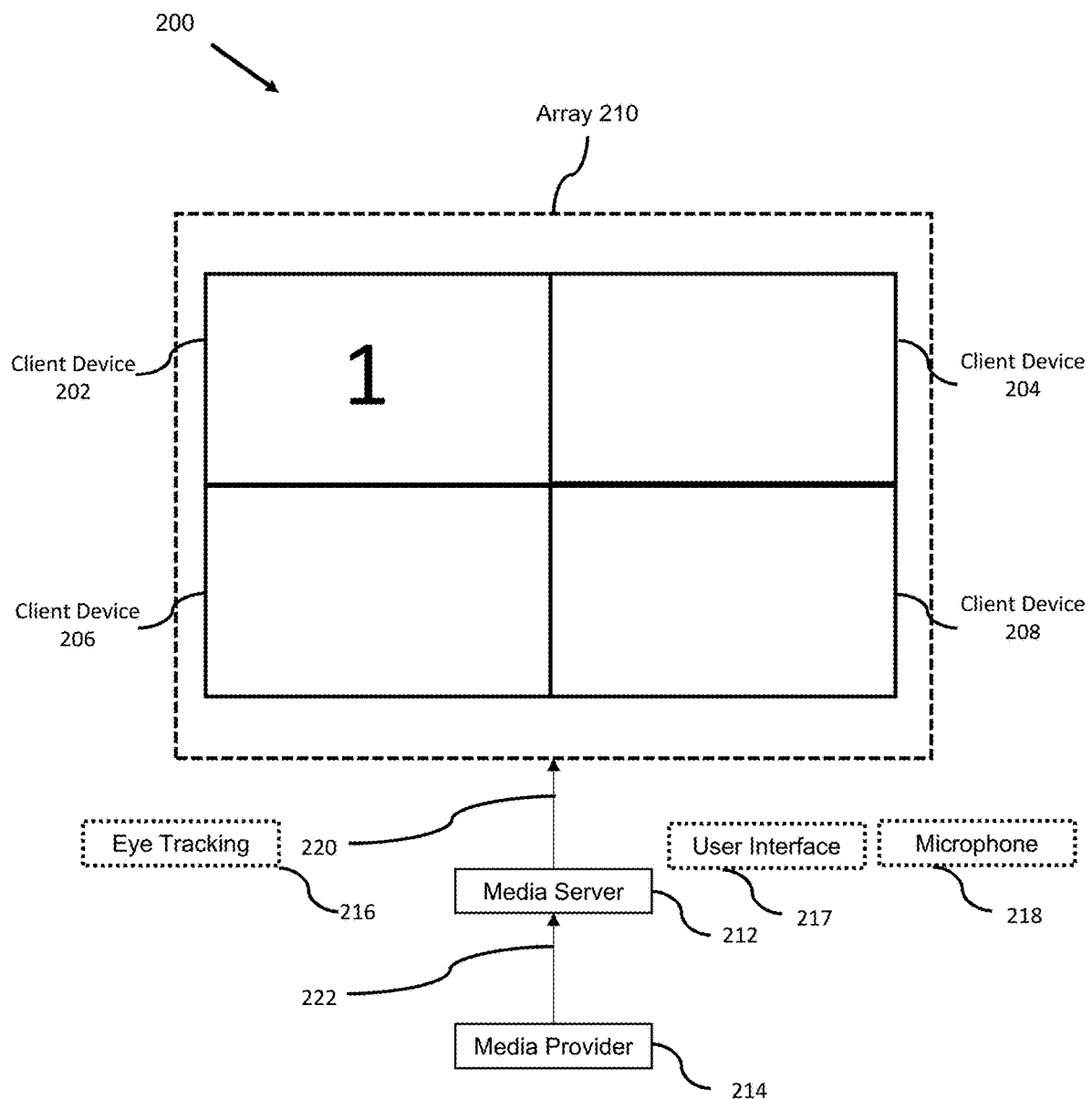
FIG. 4A illustrates a display system at a time $t_0$.
Figure 4B:
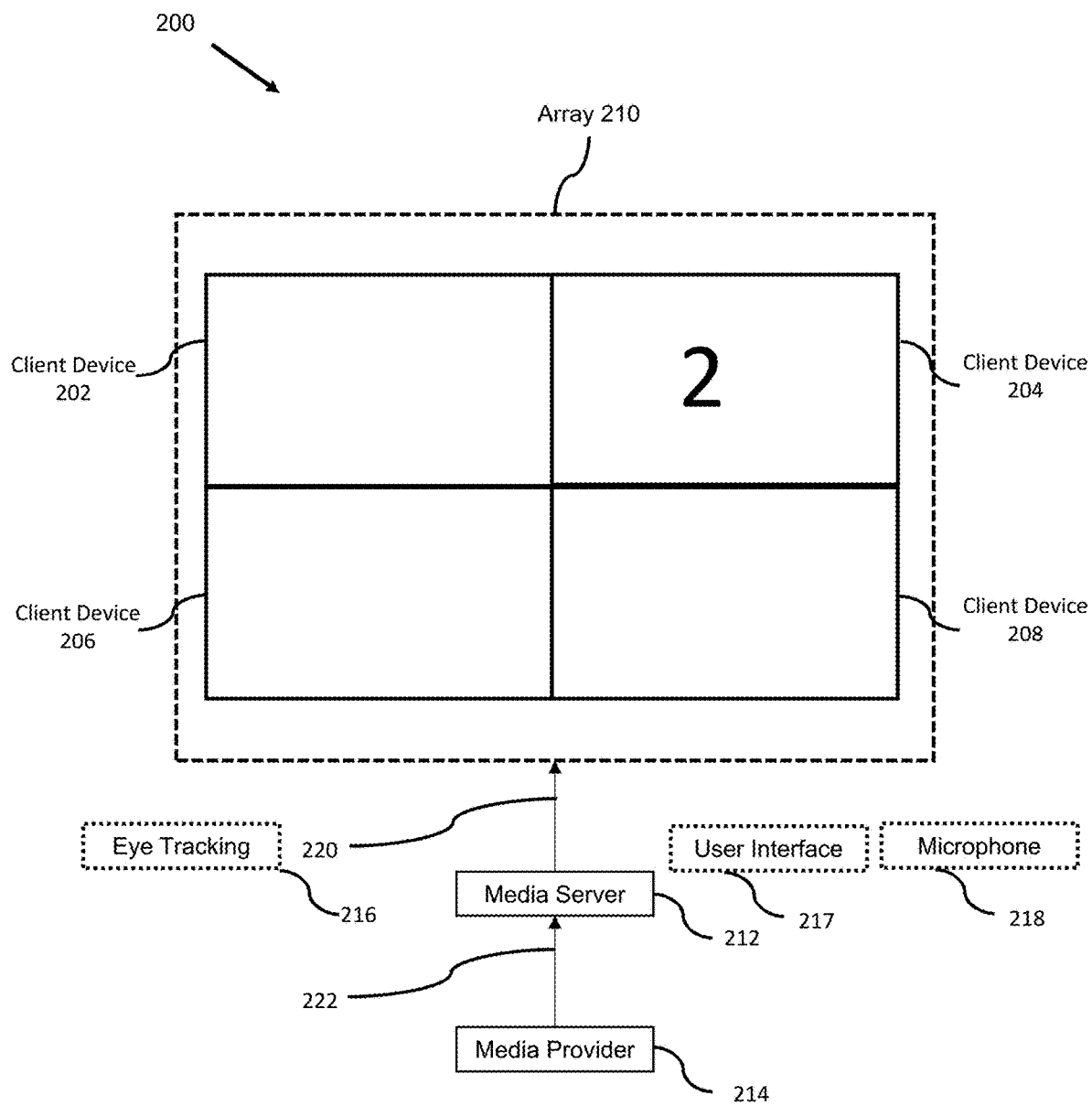
FIG. 4B illustrates a display system at a time $t_1$.
Figure 4C:
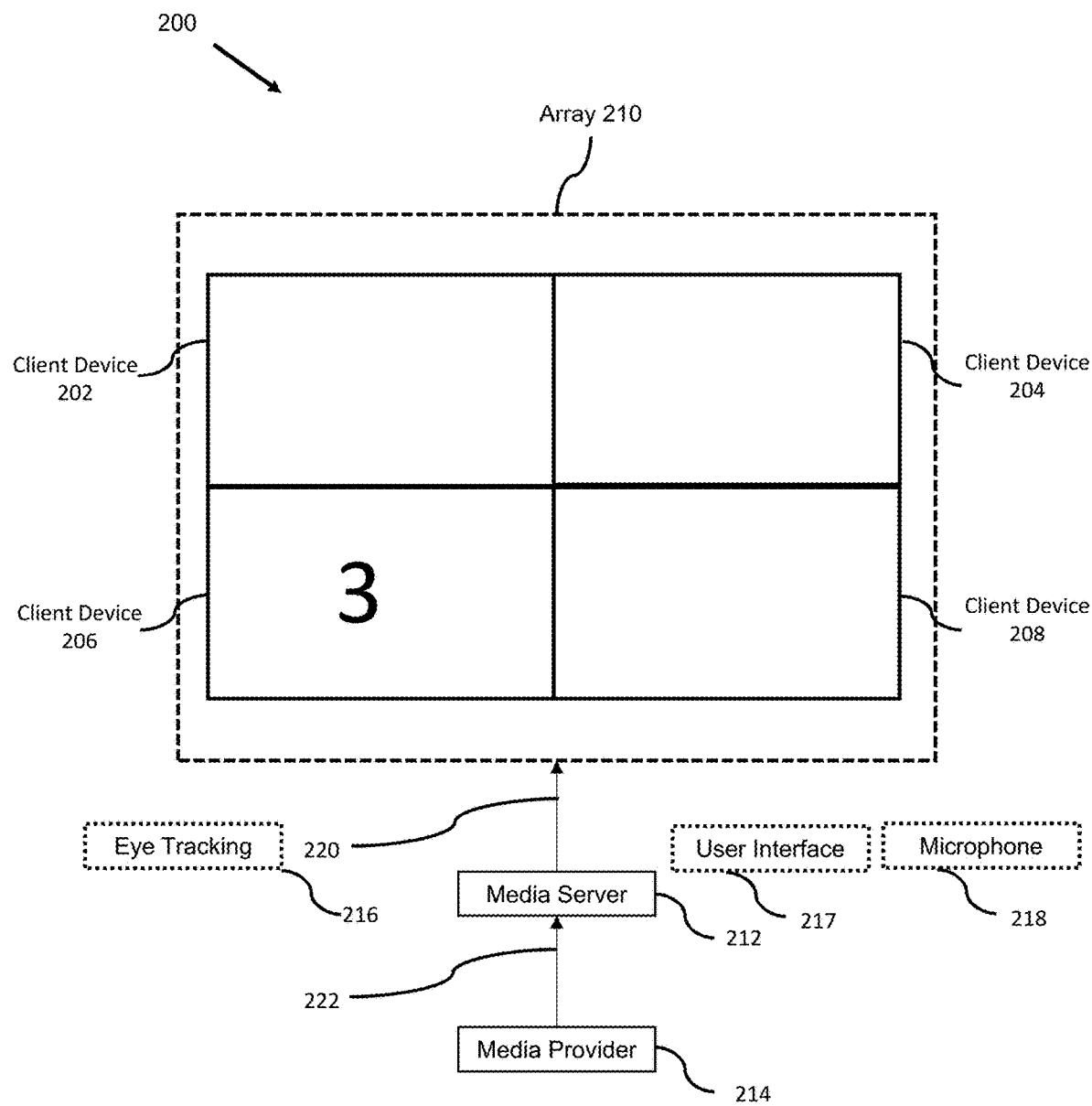
FIG. 4C illustrates a display system at a time $t_2$.

FIG. 4A-C illustrates display system 200 at a times $t_0$, $t_1$, $t_2$, and $t_3$, respectively.

For example, as shown in FIG. 4A, at time to, media server 212 may instruct client device 202 to display an image, in this example a number 1, and the user will look to client device 202, wherein eye tracking system 216 will track the user's eyes. Media server 212 will obtain information from eye tracking system 216 in reference to where client device 202 is in array 210.

Then, as shown in FIG. 4B, at time $t_1$, media server 212 may instruct client device 204 to display an image, in this example a number 2, and for client device 202 to stop displaying an image. The user will then look to client device 204, wherein eye tracking system 216 will track the user's eyes from client device 202 to client device 204. Media server 212 will obtain information from eye tracking system 216 in reference to the location of client device 204 in array 210.

This will be repeated as shown in FIG. 4C wherein at time $t_2$, media server 212 has instructed client device 204 to stop displaying an image and has instructed client device 206 to display an image. Now, eye tracking system 216 will track the user's eyes from client device 204 to client device 206.

Figure 4D:
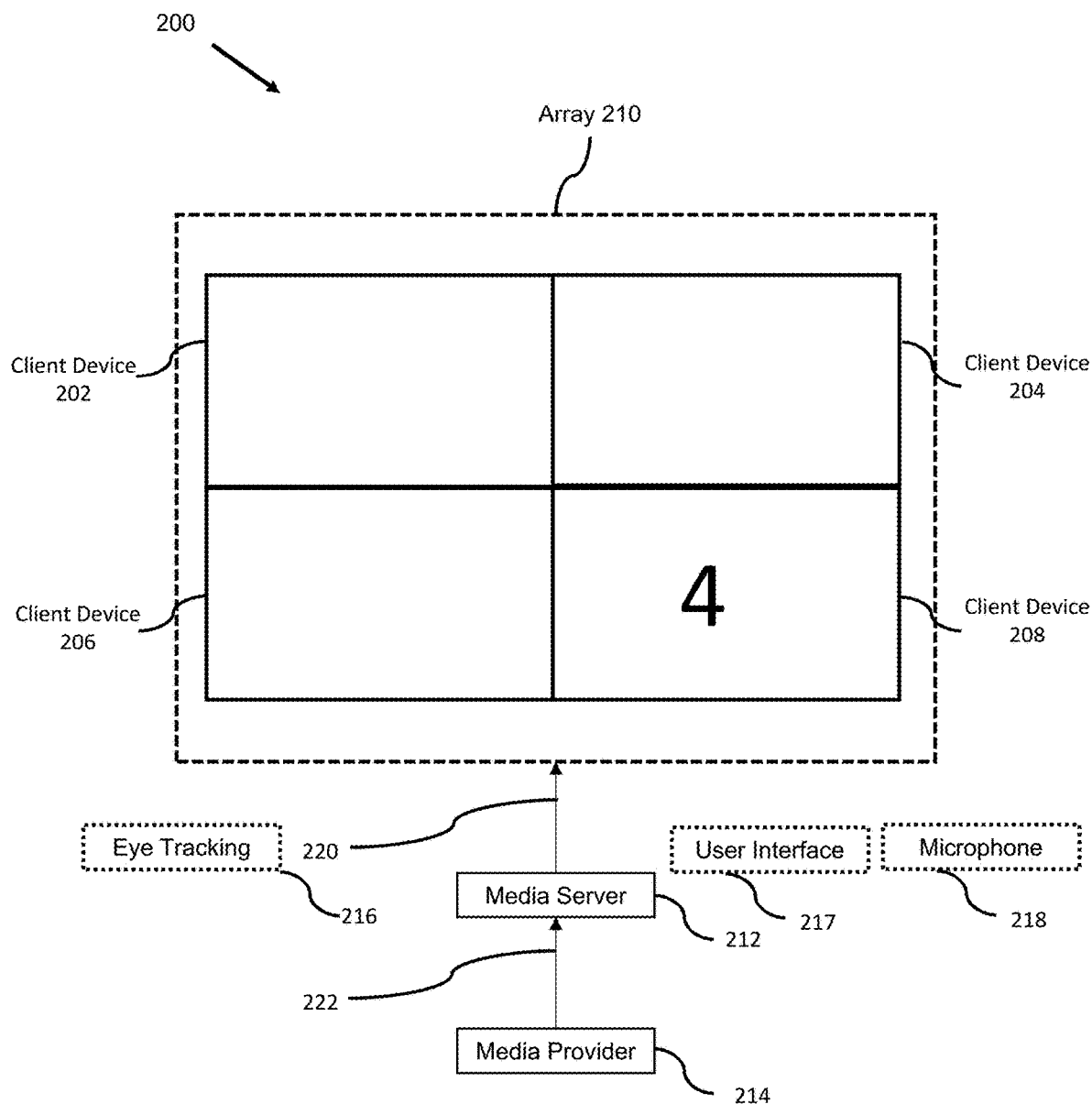
FIG. 4D illustrates a display system at a time $t_3$.

This will again be repeated as shown in FIG. 4D wherein at time $t_3$, media server 212 has instructed client device 206 to stop displaying an image and has instructed client device 208 to display an image. Eye tracking system 216 will track the user's eyes from client device 206 to client device 208. Media server 212 will receive this information from eye tracking system 216 and will recognize the relative positions of client devices 202, 204, 206, and 208.

In other embodiments, media server 212 may use a UI, optionally shown here as UI 217. In some embodiments, UI 217 may be incorporated into media server 212. In other embodiments, UI 217 may be a separate and distinct device that media server 212 is in communication with, that is able to obtain information from UI 217.

As shown in FIG. 4A, at time to, media server 212 may instruct client device 202 to display an image, in this example a number 1, and the user may input into UI 217 a "one," wherein UI 217 will register the entry. Media server 212 will obtain information from UI 217 in reference to the location of client device 202 in array 210.

Then, as shown in FIG. 4B, at time $t_1$, media server 212 may instruct client device 204 to display an image, in this example a number 2, and for client device 202 to stop displaying an image. The user will then input a "two" as displayed on client device 204, wherein UI 217 will register the input. Media server 212 will obtain information from UI 217 in reference to the location of client device 204 in array 210.

This will be repeated as shown in FIG. 4C wherein at time $t_2$, media server 212 has instructed client device 204 to stop displaying an image and has instructed client device 206 to display an image. Now, UI 217 will receive a user's input of a "three" and register the input determining the location of client device 204 in reference to client device 206.

This will again be repeated as shown in FIG. 4D wherein at time $t_3$, media server 212 has instructed client device 206 to stop displaying an image and has instructed client device 208 to display an image. UI 217 will receive the user's input of a "four" and register the input determining the location of client device 206 in reference to client device 208. Media server 212 will receive this information from UI 217 and will recognize the relative positions of client devices 202, 204, 206, and 208.

In other embodiments, media server 212 may use a microphone, optionally shown here as microphone 218. In some embodiments, microphone 218 may be incorporated into media server 212. In other embodiments, microphone 218 may be a separate and distinct device that media server 212 is in communication with, that is able to obtain information from microphone 218.

In another embodiment, as shown in FIG. 4A, at time $t_0$, media server 212 may instruct client device 202 to display an image, in this example a number 1, and the user will say "one," wherein microphone 218 will register the announcement. Media server 212 will obtain information from microphone 218 in reference to the location of client device 202 in array 210.

Then, as shown in FIG. 4B, at time $t_1$, media server 212 may instruct client device 204 to display an image, in this example a number 2, and for client device 202 to stop displaying an image. The user will then say "two" as displayed on client device 204, wherein microphone 218 will register the announcement. Media server 212 will obtain information from microphone 218 in reference to the location of client device 204 in array 210.

This will be repeated as shown in FIG. 4C wherein at time $t_2$, media server 212 has instructed client device 204 to stop displaying an image and has instructed client device 206 to display an image. Now, microphone 218 will hear the user announce "three" and register the announcement determining the location of client device 204 in reference to client device 206.

This will again be repeated as shown in FIG. 4D wherein at time $t_3$, media server 212 has instructed client device 206 to stop displaying an image and has instructed client device 208 to display an image. Microphone 218 will hear the user announce "four" and register the announcement determining the location of client device 206 in reference to client device 208. Media server 212 will receive this information from microphone 218 and will recognize the relative positions of client devices 202, 204, 206, and 208.

Returning to FIG. 1, once the server determines the configuration (S104), the server receives the A/V data (S106). For example, media provider 214, as shown in FIG. 3, will provide a stream of A/V data packets to media server 212. Interface 314 will receive the A/V data packets, and will pass the information to controller 320.

Returning to FIG. 1, once the server receives the A/V data (S106), the server decodes the A/V data (S108). For example, as shown in FIG. 3, interface 314 will receive the A/V data packets and controller 320 will decode the A/V data packets. This will be described in greater detail below with reference to FIG. 5.

Figure 5:
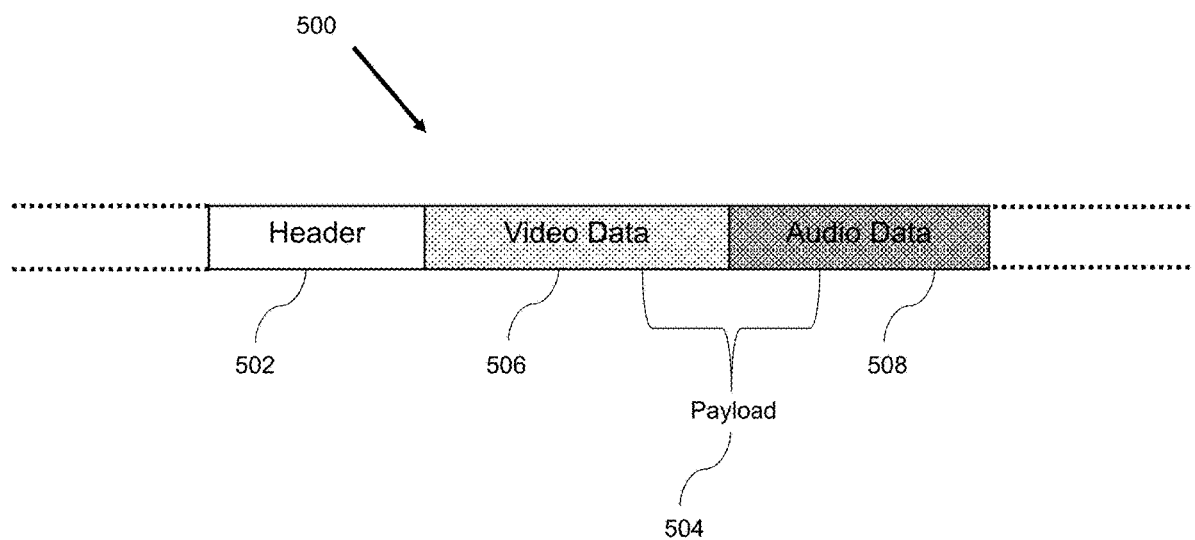
FIG. 5 illustrates an example data packet from streaming data.

FIG. 5 illustrates an example data packet 500 from streaming data.

As shown in the figure, data packet 500 includes a header 502 and a payload 504. In this example, payload 504 includes a video data portion 506 and an audio data portion 508. It should be noted, that packet 500 merely represents an amalgamation of any known type of encoded data packets. One of ordinary skill in the art, would recognize that video data may not be within one section and audio data may not be within one section. As illustrated here, packet 500 is provided merely for purposes of discussion and illustration indicating that within a payload, there is video data and audio data.

For example, header 502 will instruct controller 320, as shown in FIG. 3, as to where video data 506 starts and stops for extraction. Additionally, header 502 will instruct controller 320 as to where audio data 508 starts and stops within packet 500 for extraction.

Returning to FIG. 1, once the server decodes the A/V data (S108), the server separates decoded A/V data (S110). For example, as shown in FIG. 3, display program 318 includes instructions, that when executed by controller 320, enable the controller to separate the decoded A/V data. Video data 506 will be separated into n×m distinct pieces, which as shown in FIG. 2 in this example is 2×2, or four distinct pieces.

Returning to FIG. 1, once the server separates decoded video data (S110), the server encodes A/V data (S112). This will be described in greater detail with reference to FIG. 6.

Figure 6:
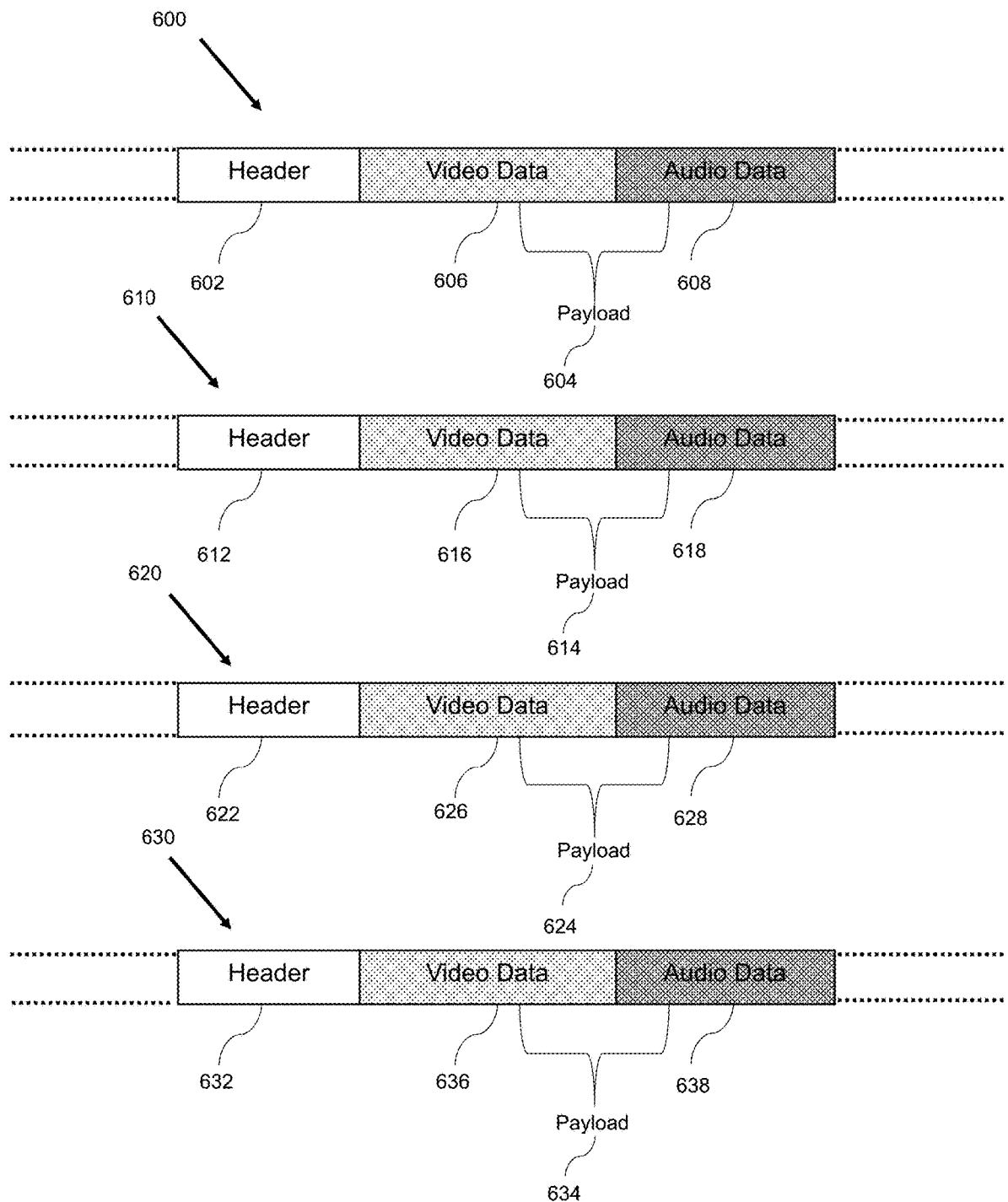
FIG. 6 illustrates example data packets from streaming data.

FIG. 6 illustrates example data packet 600, data packet 610, data packet 620, and data packet 630 from four respective streams data.

As shown in the figure, data packet 600 includes a header 602 and a payload 604. In this example, payload 604 includes a video data portion 606 and an audio data portion 608. Data packet 610 includes a header 612 and a payload 614. In this example, payload 614 includes a video data portion 616 and an audio data portion 618. Data packet 620 includes a header 622 and a payload 624. In this example, payload 624 includes video data 626 and audio data 628. Data packet 630 includes header 632 and payload 634. In this example, payload 634 includes video data 636 and audio data 638. Similar to data packet 500 as discussed above, packets 600, 610, 620, and 630 merely represent packets having video and audio data.

In some embodiments, returning to FIG. 6, each example packet contains an audio data field, for example: data packet 600 contains audio data 608. In some cases, each client device in the array is transmitted the full audio data, however, all but one device may additionally be provided with an instruction to not play the audio data. For example, as mentioned previously, each client device, in this example as shown in FIG. 2 as client device 202, 204, 206, and 208; is transmitted the data, and in some cases each client device receives the full audio data. However, three of the four client devices in this example will receive an additional instruction to not play the audio data. Therefore, only one of the client devices within array 210 will be playing sound corresponding to the audio data.

In another embodiment, all client devices are transmitted a data packet containing an audio data field, whereas all except one client device will receive audio data fields containing empty data. For example, as shown in FIG. 2, client device 202, 204, 206, and 208 are all transmitted a data packet containing an audio data field. However, in this example, three out of the four audio data fields will contain empty data.

Returning to FIG. 1, once the server encodes A/V data (S112), the server transmits encoded streams (S114). For example, returning to FIG. 3, controller 320 will execute instructions from display program 318 to instruct radio 312 to transmit data stream 600 to client device 202. Controller 320 may also execute instructions from display program 318 to instruct radio 312 to transmit data stream 610 to client device 204. Controller 320 will also execute similar instructions for radio 312 to transmit data stream 620 to client device 206. Lastly, controller 320 will execute similar instructions for radio 312 to transmit data stream 630 to client device 208.

In other embodiments, when communication channel 220 is a wired connection, controller 320 will execute instructions from display program 318 to instruct interface 314 to transmit data stream 600 to client device 202. Controller 320 will execute similar instructions for interface 314 to transmit data stream 610 to client device 204, and data stream 620 to client device 206. Lastly, controller 320 will execute similar instructions for interface 314 to transmit data stream 630 to client device 208.

Returning to FIG. 1, once the server transmits encoded streams (S114), the array receives the stream (S116). For example, as shown in FIG. 2, media server 212 transmits the data streams as shown in FIG. 6 to each respective client device within array 210. After the server receives the stream (S116), the algorithm stops (S118).

In the example embodiments discussed above with reference to FIGS. 1-6, a media server determines an arrangement of devices within an array of devices, receives streaming data from a media provider, splits the streaming data from the media provider and then provides respective streams to all the devices within the array of devices.

However, in other embodiments, one main device within an array of devices determines an arrangement of devices within an array of devices, with which the main device is included. A media server receives streaming data from a media provider and provides the streaming data to the one main device within the array of devices. The one main device then splits the streaming data from the media server and then provides respective streams to all the remaining devices within the array of devices. This will now be described in greater detail with reference to FIGS. 7-9.

Figure 7:
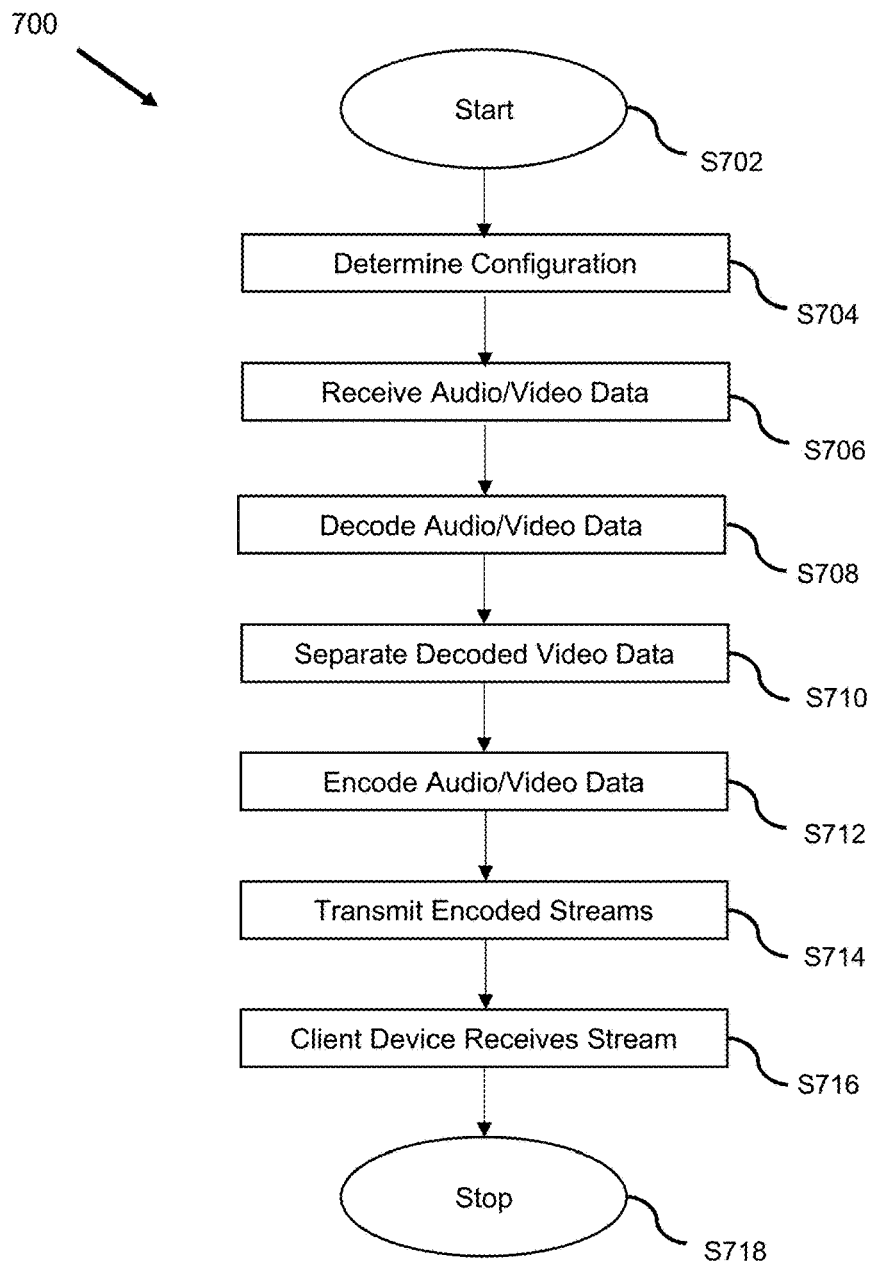
FIG. 7 illustrates an algorithm to be executed by a processor for streaming to display array in accordance with aspects of the present disclosure.

FIG. 7 illustrates an algorithm 700 to be executed by a processor for streaming to display array in accordance with aspects of the present disclosure.

As shown in the figure, algorithm 700 starts (S702), and the client device determines the configuration (S704).

Figure 8:
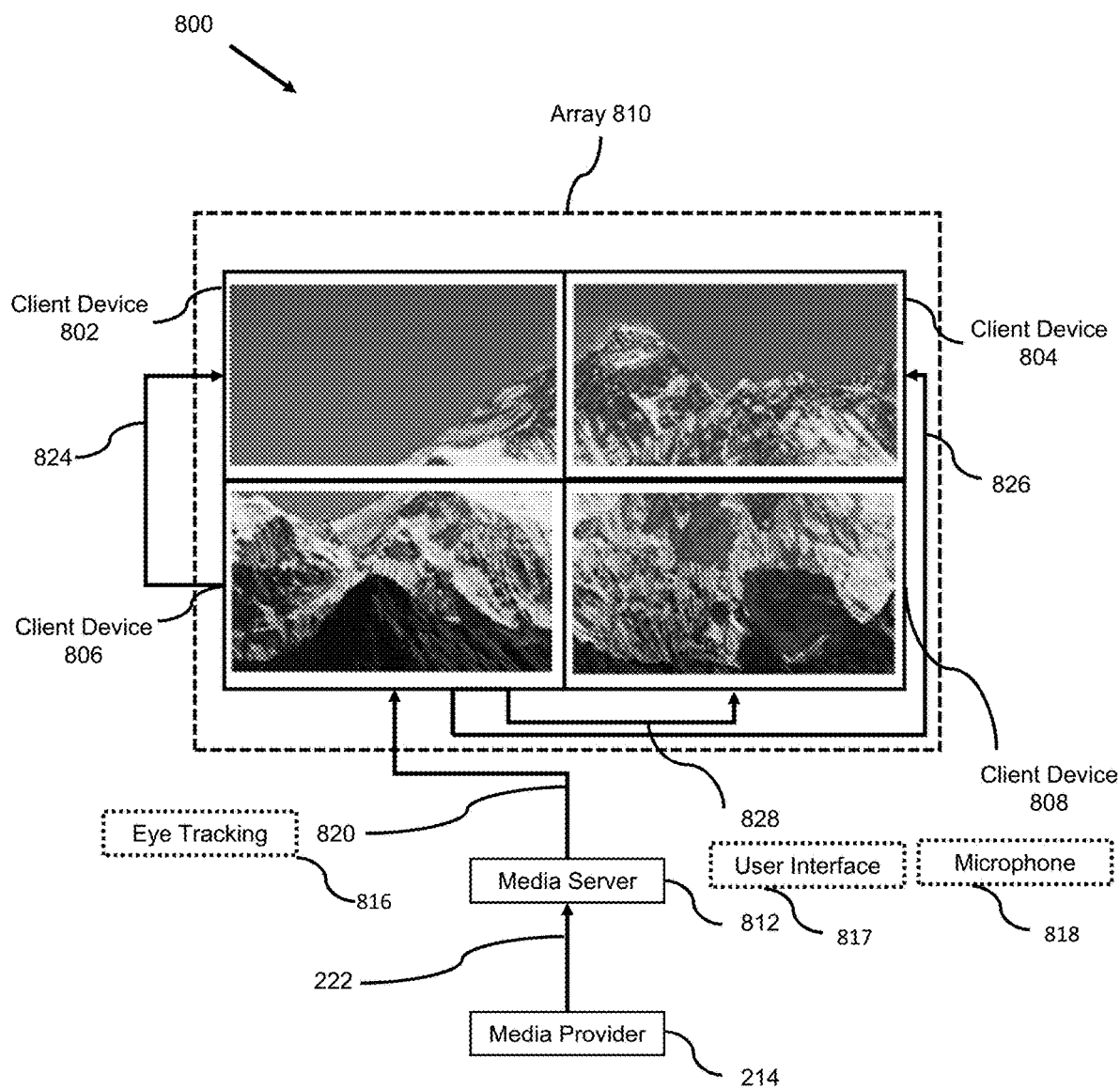
FIG. 8 illustrates a display system.

FIG. 8 illustrates a display system 800.

As shown in the figure, display system 800 includes a client device 802, a client device 804, a client device 806, a client device 808, an array 810, a media server 812, media provider 214, an eye tracking option 816, a microphone option 818, a communication channel 820, a communication channel 824, a communication channel 826, a communication channel 828, and communication channel 222.

Media provider 214 is configured to communicate with media server 812 by way of communication channel 222, and media server 812 is configured to communicate with client device 806 by way of communication channel 820. Client device 806 is configured to communicate with client device 802 by way of communication channel 824. Client device 806 is also configured to communicate with client device 804 by way of communication channel 826. Client device 806 is additionally configured to communicate with client device 808 by way of communication channel 828.

Figure 9:
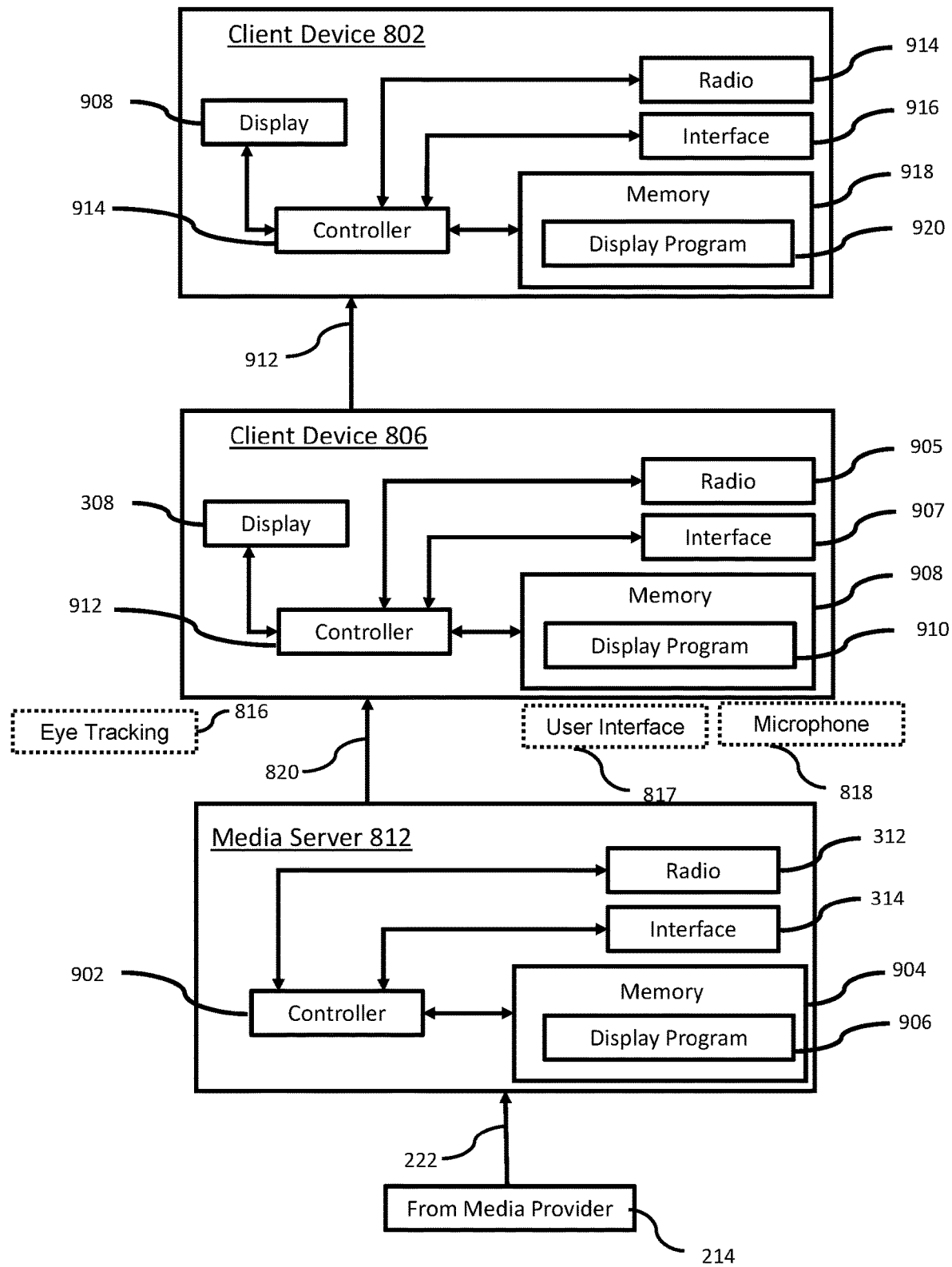
FIG. 9 illustrates an exploded view of the client devices and the media server of FIG. 8.

FIG. 9 illustrates an exploded view of client device 802, client device 806 and media server 812 of FIG. 8, as well as an optional tracking system 816, an optional UI 817, and an optional microphone 818.

As shown in FIG. 9, media server 812 includes: a controller 902; a memory 904, which has stored therein a display program 906; and at least one radio, a sample of which is illustrated as radio 312; and interface circuit 314.

In this example, controller 902, memory 904, radio 312, and interface circuit 314 are illustrated as individual devices. However, in some embodiments, at least two of controller 902 main memory 904, radio 312, and interface circuit 314 may be combined as a unitary device. Further, in some embodiments, at least one of controller 902 and memory 904 may be implemented as a computer having tangible computer-readable media for carrying or having computer-executable instructions or data structures stored thereon.

Controller 902, may be any device capable of controlling general operations of media server 212 and includes, but is not limited to, a central processing unit (CPU), a hardware microprocessor, a single core processor, a multi-core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of media server 212.

Memory 904 can store various programming, and user content, and data including display program 906. In some embodiments, as will be described in greater detail below, display program 906 includes instructions, that when executed by controller 902, enable media server 812 to receive a stream of encoded A/V data from media provider 214 and provide the stream of encoded A/V data to one of the client devices within array 810.

Client device 806 includes: radio 905; an interface circuit 907; a memory 908 which has stored therein a display program 910; display 308; a controller 912; an optional eye tracking system 816; an optional UI 817, and an optional microphone 818.

In this example, controller 912, memory 908, radio 905, and interface circuit 907 are illustrated as individual devices. However, in some embodiments, at least two of controller 912, memory 908, radio 905, and interface circuit 907 may be combined as a unitary device. Whether as individual devices or as combined devices, controller 912, memory 908, radio 905, and interface circuit 907 may be implemented as any combination of an apparatus, a system and an integrated circuit. Further, in some embodiments, at least one of controller 912, memory 908 and interface circuit 907 may be implemented as a computer having non-transitory computer-readable media for carrying or having computer-executable instructions or data structures stored thereon.

Radio 905, (and preferably two or more radios), may also be referred to as a wireless communication circuit, such as a Wi-Fi WLAN interface radio transceiver and is operable to communicate with media server 812 and with client device 802. Radio 905 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Client device 806 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Controller 912, may be any device capable of controlling general operations of client device 806 and includes, but is not limited to, a central processing unit (CPU), a hardware microprocessor, a single core processor, a multi-core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 806.

Memory 908 can store various programming, and user content, and data including display program 906. In some embodiments, as will be described in greater detail below, display program 906 includes instructions that, when executed by controller 912, enable controller 912 to cause client device 806 to: receive a stream of encoded A/V data from media server 812; decode the audio/video data to gain access to decoded video data and decoded audio data; determine the configuration of the client devices within array 810; separate the decoded video data into n times m distinct video data payloads, which in this example embodiment is 2×2, or four distinct video data payloads; encode n times m converted streams of encoded A/V data, each converted stream including a respective one of the n times m distinct video data payloads; and transmit (n×m)−1 encoded converted streams to the plurality of client devices, respectively, based on the determined configuration of the n×m array of client devices.

In some embodiments, as will be described in greater detail below, display program 906 includes instructions that, when executed by controller 912, enable controller 912 to additionally cause client device 806 to: remove, when encoding the n times m converted streams of encoded A/V data, the audio data from all of the (n×m)−1 encoded converted streams of encoded A/V data.

In some embodiments, as will be described in greater detail below, display program 906 includes instructions that, when executed by controller 912, enable controller 912 to additionally cause client device 806 to transmit an instruction, to all of the plurality of client devices, to not play audio data.

In some embodiments, as will be described in greater detail below, client device 806 includes eye tracking system 816 and display program 906 includes instructions that, when executed by controller 912, enable controller 912 to additionally cause client device 806 to transmit (n×m)−1 encoded formation identification streams to the (n×m)−1 other client devices within array 810, respectively, and determine the configuration of the n×m array of client devices within array 810 based on the arrangement signal, and wherein each (n×m)−1 encoded formation identification stream is configured to instruct a respect one of the (n×m)−1 encoded formation identification streams to the client devices within array 810 to display an image to lead the gaze of a user.

In some embodiments, as will be described in greater detail below, client device 806 includes microphone 818 and display program 906 includes instructions that, when executed by controller 912, enable controller 912 to additionally cause client device 806 to transmit (n×m)×1 encoded formation identification streams to the (n×m)−1 other client devices within array 810, respectively, and determine the configuration of the (n×m) array of client devices based on the arrangement signal, wherein each (n×m)−1 encoded formation identification stream is configured to instruct a respect one of the (n×m) array of client devices to display an image prompting a respective vocal response by a user, and wherein the arrangement signal is based on the sum of the vocal responses by the user.

In some embodiments, as will be described in greater detail below, client device 806 includes UI 817 and display program 906 includes instructions that, when executed by controller 912, enable controller 912 to additionally cause client device 806 to transmit (n×m)−1 encoded formation identification streams to the (n×m)−1 other client devices within array 810, respectively, and determine the configuration of the (n×m) array of client devices based on the arrangement signal, wherein each (n×m) encoded formation identification stream is configured to instruct a respect one of then times m array of client devices within array 810 to display an image prompting a respective user interface response by the user via the UI 817, and wherein the arrangement signal is based on the sum of the user interface responses by the user via UI 817.

Interface circuit 907 can include one or more connectors, such as RF connectors, or Ethernet connectors, and/or wireless communication circuitry, such as 5G circuitry and one or more antennas. Interface circuit 907 receives content from media server 812 and provides content to the other client devices within array 810 (including for example client device 802) by known methods, non-limiting examples of which include terrestrial antenna, satellite dish, wired cable, DSL, optical fibers, or 5G as discussed above.

Client device 802 includes: radio 914; an interface circuit 916; a memory 918 which has stored therein a display program 920; display 308; and a controller 914.

In this example, controller 914, memory 918, radio 914, and interface circuit 916 are illustrated as individual devices. However, in some embodiments, at least two of controller 914, memory 918, radio 914, and interface circuit 916 may be combined as a unitary device. Whether as individual devices or as combined devices, controller 914, memory 918, radio 914, and interface circuit 916 may be implemented as any combination of an apparatus, a system and an integrated circuit. Further, in some embodiments, at least one of controller 914, memory 918 and interface circuit 916 may be implemented as a computer having non-transitory computer-readable media for carrying or having computer-executable instructions or data structures stored thereon.

Controller 914, may be any device capable of controlling general operations of client device 802 and includes, but is not limited to, a central processing unit (CPU), a hardware microprocessor, a single core processor, a multi-core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 802.

Memory 918 can store various programming, and user content, and data including display program 920. In some embodiments, as will be described in greater detail below, display program 920 includes instructions that, when executed by controller 914, enable controller 914 to cause client device 802 to: receive a stream of encoded A/V data from client device 806; decode the audio/video data to gain access to decoded video data and decoded audio data; and play the decoded A/V data.

In some embodiments, as will be described in greater detail below, display program 920 includes instructions that, when executed by controller 914, enable controller 914 to additionally cause client device 802 to: receive an additional instructions from client device 806 not to play audio data.

In this example embodiment, client device 806 is a main client device that will instruct the remaining client devices within array 810. FIG. 9 illustrates client device 802 only, merely for purposes of discussion and brevity. It should be noted that client device 804 and client device 806 will have similar components to and operate in a similar manner to client device 802.

Interface circuit 916 can include one or more connectors, such as RF connectors, or Ethernet connectors, and/or wireless communication circuitry, such as 5G circuitry and one or more antennas. Interface circuit 916 receives content from client device 806 by known methods, non-limiting examples of which include terrestrial antenna, satellite dish, wired cable, DSL, optical fibers, or 5G as discussed above.

Radio 914 (and preferably two or more radios), may also be referred to as a wireless communication circuit, such as a Wi-Fi WLAN interface radio transceiver and is operable to communicate with client device 806. Radio 914 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Client device 802 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

In operation, as mentioned above, client device 806 determines the configuration of the client devices within array 810 by any known system or method, non-limiting examples of which include eye tracking system 816, UI 817, microphone 818 and combinations thereof.

Returning to FIG. 7, once the client device determines the configuration (S704), the client device receives the A/V data (S706). For example, media provider 214, as shown in FIG. 9, will provide a stream of A/V data packets to media server 812. Media server 812 will then receive the stream and provide the A/V data to client device 806 through communication channel 820. Interface 907 will then receive the A/V data packets, and will pass the information to controller 912.

Returning to FIG. 7, once the client device receives the A/V data (S706), the client device decodes the A/V data (S708). For example, as shown in FIG. 9, controller 912 will decode the A/V data packets in a manner similar to media server 212 as discussed above with reference to FIG. 5.

Returning to FIG. 7, once the client device decodes the A/V data (S708), the client device separates decoded video data (S710). For example, as shown in FIG. 9, display program 910 includes instructions, that when executed by controller 912, enable the controller to separate the decoded A/V data. Client device 806 will separate the decoded A/V data in a manner similar to media server 212 as discussed above with reference to FIG. 5.

Returning to FIG. 7, once the client device separates decoded video data (S710), the client device encodes A/V data (S712). For example, as shown in FIG. 9, client device 806 will encode the A/V data in a manner similar to media server 212 as discussed above with reference to FIG. 5.

Returning to FIG. 7, once the client device encodes A/V data (S712), the client device transmits encoded streams (S714). For example, returning to FIG. 9, controller 912 will execute instructions from display program 910 to instruct radio 905 to transmit data stream 600 to client device 802. Controller 912 may also execute instructions from display program 910 to instruct radio 905 to transmit data stream 610 to client device 804. Controller 912 will execute similar instructions for radio 905 to transmit data stream 620 to client device 808. Client device 806 would additionally retain one data stream, in this example, data stream 630.

In other embodiments, when communication channel 912 is a wired connection, controller 912 will execute instructions from display program 910 to instruct interface 907 to transmit data stream 600 to client device 802. Controller 912 will execute similar instructions for interface 907 to transmit data stream 610 to client device 804, and data stream 620 to client device 808. Client device 806 would retain one data stream, in this example, data stream 630.

Returning to FIG. 7, once the server transmits encoded streams (S714), the client device receives the stream (S716). After the client device receives the stream (S716), the algorithm stops (S718).

Conventionally, there was a problem with an array of display devices being used to display streamed data related to the timing and distribution of the data.

In accordance with aspects of the present disclosure, the media server identifies multiple client devices and prompts a 'video grid' mode of presentation. The server may identify each client device's location using a multitude of methods, some including a known eye tracking system or a microphone. The server then breaks the video streams into multiple segments and streams them to individual client devices. One of the client devices may request stream content from the server and multicast the data to the other client devices. With mutual coordination, each client can display a quadrant or segment of the video content as well as graphics.

The benefits of efficiently distributing A/V data to an array of client devices include increasing the display resolution of the streamed A/V data, as well as cost benefits for choosing an array of small devices rather than one large TV.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A server device for use with a stream of encoded audio/video data and an n×m array of client devices, n being a first positive integer, m being a second positive integer, each client device being configured to display a respective display content, at least one of the n×m array of client devices being configured to play audio content, said server device comprising:
    a system configured to generate an arrangement signal;
    a memory; and
    a processor configured to execute instructions stored on said memory to cause said server device to:
        receive the stream of encoded audio/video data;
        decode the audio/video data to gain access to decoded video data and decoded audio data;
        transmit n times m encoded formation identification streams to the n×m array of client devices, respectively;
        determine the configuration of the n×m array of client devices based on the arrangement signal, wherein each n times m encoded formation identification stream is configured to instruct a respective one of the n×m array of client devices to display an image;
        separate the decoded video data into n times m distinct video data payloads;
        encode n times m subdivided streams of encoded audio/video data, each converted stream including a respective one of the n times m distinct video data payloads; and
        transmit the n times m encoded converted streams to the n×m array of client devices, respectively, based on the determined configuration of the n×m array of client devices.

2. The server device of claim 1, wherein the processor is further configured to execute instructions stored on said memory to additionally cause said server device to remove, when encoding the n times m converted streams of encoded audio/video data, audio data from all but one of the n times m converted streams of encoded audio/video data.

3. The server device of claim 1, wherein the processor is further configured to execute instructions stored on said memory to additionally cause said server device to transmit an instruction, to all but one of the n×m array of client devices, to not play audio data.

4. The server device of claim 1, wherein:
    the system comprises an eye tracking system;
    the eye tracking system is configured to generate the arrangement signal by tracking a gaze of a user amongst the n×m array of client devices; and
    each n times m encoded formation identification stream is configured to instruct the respective one of the n×m array of client devices to display the image to lead the gaze of the user.

5. The server device of claim 1, wherein:
    the system comprises a microphone;
    wherein the microphone is configured to generate the arrangement signal;
    each n times m encoded formation identification stream is configured to instruct the respective one of the n×m array of client devices to display the image to prompt a respective vocal response by the user; and
    the arrangement signal is based on the sum of the vocal responses by the user.

6. The server device of claim 1, wherein:
the system comprise a user interface;
the user interface is configured to generate the arrangement signal;
  each n times m encoded formation identification stream is configured to instruct the respective one of the n×m array of client devices to display the image to prompt a respective user interface response by the user via the user interface; and
  the arrangement signal is based on the sum of the user interface responses by the user via the user interface.

7. A method of using a server device with a stream of encoded audio/video data and an n×m array of client devices, n being a first positive integer, m being a second positive integer, each client device being configured to display a respective display content, at least one of the n×m array of client devices being configured to play audio content, said method comprising:
generating an arrangement signal;
receiving, via a processor configured to execute instructions stored on a memory, the stream of encoded audio/video data;
decoding, via the processor, the audio/video data to gain access to decoded video data and decoded audio data;
transmitting n times m encoded formation identification streams to the n×m array of client devices, respectively;
determining, via the processor, the configuration of the n×m array of client devices based on the arrangement signal, wherein each n times m encoded formation identification stream is configured to instruct a respect one of the n×m array of client devices to display an image;
separating, via the processor, the decoded video data into n times m distinct video data payloads;
encoding, via the processor, n times m converted streams of encoded audio/video data, each converted stream including a respective one of the n times m distinct video data payloads; and
transmitting, via the processor, the n times m encoded converted streams to the n×m array of client devices, respectively, based on the determined configuration of the n×m array of client devices.

8. The method of claim 7, further comprising removing, via the processor and when encoding the n times m converted streams of encoded audio/video data, audio data from all but one of the n times m converted streams of encoded audio/video data.

9. The method of claim 7, further comprising transmitting, via the processor, an instruction, to all but one of the n×m array of client devices, to not play audio data.

10. The method of claim 7, wherein:
the generating the arrangement signal, via an eye tracking system, is by tracking a gaze of a user amongst the n×m array of client devices; and
each n times m encoded formation identification stream is configured to instruct the respective one of the n×m array of client devices to display the image to lead the gaze of the user.

11. The method of claim 7, wherein:
the generating the arrangement signal is via a microphone;
  each n times m encoded formation identification stream is configured to instruct the respective one of the n×m array of client devices to display the image to prompt a respective vocal response by the user; and
  the arrangement signal is based on the sum of the vocal responses by the user.

12. The method of claim 7, wherein:
the generating the arrangement signal is via a user interface;
  each n times m encoded formation identification stream is configured to instruct the respective one of the n×m array of client devices to display the image to prompt a respective user interface response by the user via the user interface; and
  the arrangement signal is based on the sum of the user interface responses by the user via the user interface.

13. A non-transitory, computer-readable media having computer-readable instructions stored thereon, the computer-readable instructions being capable of being read by a server device with a stream of encoded audio/video data and an n×m array of client devices, n being a first positive integer, m being a second positive integer, each client device being configured to display a respective display content, at least one of the n×m array of client devices being configured to play audio content, wherein the computer-readable instructions are capable of instructing the server device to perform the method comprising:
receiving, via a processor configured to execute instructions stored on a memory, the stream of encoded audio/video data;
decoding, via the processor, the audio/video data to gain access to decoded video data and decoded audio data;
transmitting n times m encoded formation identification streams to the n×m array of client devices, respectively;
determining, via the processor, the configuration of the n×m array of client devices based on an arrangement signal, wherein the arrangement signal is generated by a system of the server device, and wherein each n times m encoded formation identification stream is configured to instruct a respect one of the n×m array of client devices to display an image;
separating, via the processor, the decoded video data into n times m distinct video data payloads;
encoding, via the processor, n times m converted streams of encoded audio/video data, each converted stream including a respective one of the n times m distinct video data payloads; and
transmitting, via the processor, the n times m encoded converted streams to the n×m array of client devices, respectively, based on the determined configuration of the n×m array of client devices.

14. The non-transitory, computer-readable media of claim 13, wherein the computer-readable instructions are capable of instructing the server device to perform the method further comprising removing, via the processor and when encoding the n times m converted streams of encoded audio/video data, audio data from all but one of the n times m converted streams of encoded audio/video data.

15. The non-transitory, computer-readable media of claim 13, wherein the computer-readable instructions are capable of instructing the server device to perform the method further comprising transmitting, via the processor, an instruction to all but one of the n×m array of client devices, to not play audio data.

16. The non-transitory, computer-readable media of claim 13, wherein:
the system comprises an eye tracking system;
the generating the arrangement signal, via the eye tracking system, is by tracking a gaze of a user amongst the n×m array of client devices; and each n times m encoded formation identification stream is configured to instruct the respective one of the n×m array of client devices to display the image to lead the gaze of the user.

17. The non-transitory, computer-readable media of claim 13, wherein:
the system comprises a microphone;
the generating the arrangement signal is via the microphone;
each n times m encoded formation identification stream is configured to instruct the respective one of the n×m array of client devices to display the image prompting a respective vocal response by the user; and
the arrangement signal is based on the sum of the vocal responses by the user.

18. The non-transitory, computer-readable media of claim 13, wherein:
the system comprises a user interface;
the generating the arrangement signal is via the user interface;
each n times m encoded formation identification stream is configured to instruct the respective one of the n×m array of client devices to display the image prompting a respective user interface response by the user via the user interface; and
the arrangement signal is based on the sum of the user interface responses by the user via the user interface.

19. A main client device for use with a stream of encoded audio/video data and a plurality of client devices, said main client device and the plurality of client devices being configured in an n×m array of client devices, n being a first positive integer, m being a second positive integer, each client device being configured to display a respective display content, said main client device comprising:
a system configured to generate an arrangement signal;
a memory having menu data stored therein; and
a processor configured to execute instructions stored on said memory to cause said main client device to:
receive the stream of encoded audio/video data;
decode the audio/video data to gain access to decoded video data and decoded audio data;
transmit n times m encoded formation identification streams to the n×m array of client devices, respectively;
determine the configuration of the n×m array of client devices based on the arrangement signal, wherein each n times m encoded formation identification stream is configured to instruct a respective one of the n×m array of client devices to display an image;
separate the decoded video data into n times m distinct video data payloads;
encode n times m converted streams of encoded audio/video data, each converted stream including a respective one of the n times m distinct video data payloads; and
transmit (n×m)−1 encoded converted streams to the plurality of client devices, respectively, based on the determined configuration of the n×m array of client devices.

20. The main client device of claim 19, wherein the processor is further configured to execute instructions stored on said memory to additionally cause said main client device to remove, when encoding the n times m converted streams of encoded audio/video data, audio data from all of the (n×m)−1 encoded converted streams of encoded audio/video data.

21. The main client device of claim 19, wherein the processor is further configured to execute instructions stored on said memory to additionally cause said main client device to transmit an instruction, to all of the plurality of client devices, to not play audio data.

22. The main client device of claim 19, wherein:
the system comprises an eye tracking system;
the eye tracking system is configured to generate the arrangement signal by tracking a gaze of a user amongst the n×m array of client devices; and
each n times m encoded formation identification stream is configured to instruct the respective one of the n×m array of client devices to display the image to lead the gaze of the user.

23. The main client device of claim 19, wherein:
the system comprises a microphone;
the microphone is configured to generate an arrangement signal;
each n times m encoded formation identification stream is configured to instruct the respective one of the n×m array of client devices to display the image prompting a respective vocal response by the user; and
the arrangement signal is based on the sum of the vocal responses by the user.

24. The main client device of claim 19, wherein:
the system comprises a user interface;
the user interface is configured to generate the arrangement signal;
each n times m encoded formation identification stream is configured to instruct the respective one of the n×m array of client devices to display the image prompting a respective user interface response by the user via the user interface; and
the arrangement signal is based on the sum of the user interface responses by the user via the user interface.

25. A method of using a main client device with a stream of encoded audio/video data and a plurality of client devices, said main client device and the plurality of client devices configured in an n×m array of client devices, n being a first positive integer, m being a second positive integer, each client device being configured to display a respective display content, said method comprising:
generating an arrangement signal;
receiving, via a processor configured to execute instructions stored on a memory, the stream of encoded audio/video data;
decoding, via the processor, the audio/video data to gain access to decoded video data and decoded audio data;
transmitting n times m encoded formation identification streams to the n×m array of client devices, respectively;
determining, via the processor, the configuration of the n×m array of client devices based on the arrangement signal, wherein each n times m encoded formation identification stream is configured to instruct a respect one of the n×m array of client devices to display an image;
separating, via the processor, the decoded video data into n times m distinct video data payloads;
encoding, via the processor, n times m converted streams of encoded audio/video data, each converted stream including a respective one of the n times m distinct video data payloads; and
transmitting, via the processor, (n×m)−1 encoded converted streams to the plurality of client devices, respectively, based on the determined configuration of the n×m array of client devices.

29

26. The method of claim 25, further comprising removing, via the processor, when encoding the n times m converted streams of encoded audio/video data, audio data from all of the (n×m)−1 encoded converted streams of encoded audio/video data.

27. The method of claim 25, further comprising transmitting, via the processor, an instruction, to all of the plurality of client devices, to not play audio data.

28. The method of claim 25, wherein:
the generating the arrangement signal, via an eye tracking system, is by tracking a gaze of a user amongst the n×m array of client devices; and
each n times m encoded formation identification stream is configured to instruct the respective one of the n×m array of client devices to display the image to lead the gaze of the user.

29. The method of claim 25, wherein:
the generating the arrangement signal is via a microphone;
each n times m encoded formation identification stream is configured to instruct the respective one of the n×m array of client devices to display the image prompting a respective vocal response by the user; and
the arrangement signal is based on the sum of the vocal responses by the user.

30. The method of claim 25, wherein:
the generating the arrangement signal is via a user interface, an arrangement signal;
each n times m encoded formation identification stream is configured to instruct the respective one of the n times m array of client devices to display the image prompting a respective user interface response by the user via the user interface; and
the arrangement signal is based on the sum of the user interface responses by the user via the user interface.

31. A non-transitory, computer-readable media having computer-readable instructions stored thereon, the computer-readable instructions being capable of being read by main client device for use with a stream of encoded audio/video data and a plurality of client devices, said main client device and the plurality of client devices configured in an n×m array of client devices, n being a first positive integer, m being a second positive integer, each client device being configured to display a respective display content, wherein the computer-readable instructions are capable of instructing the main client device to perform the method comprising:
receiving, via a processor configured to execute instructions stored on a memory, the stream of encoded audio/video data;
decoding, via the processor, the audio/video data to gain access to decoded video data and decoded audio data;
determining, via the processor, the configuration of the n×m array of client devices based on an arrangement signal, wherein the arrangement signal is generated by a system of the main client device, wherein each n times m encoded formation identification stream is configured to instruct a respect one of the n×m array of client devices to display an image;

30 separating, via the processor, the decoded video data into n times m distinct video data payloads;
encoding, via the processor, n times m converted streams of encoded audio/video data, each converted stream including a respective one of the n times m distinct video data payloads; and
transmitting, via the processor, (n×m)−1 encoded converted streams to the plurality of client devices, respectively, based on the determined configuration of the n×m array of client devices.

32. The non-transitory, computer-readable media of claim 31, wherein the computer-readable instructions are capable of instructing the main client device to perform the method further comprising removing, via the processor, when encoding the n times m converted streams of encoded audio/video data, audio data from all of the (n×m)−1 encoded converted streams of encoded audio/video data.

33. The non-transitory, computer-readable media of claim 31, wherein the computer-readable instructions are capable of instructing the main client device to perform the method further comprising transmitting, via the processor, an instruction, to all of the plurality of client devices, to not play audio data.

34. The non-transitory, computer-readable media of claim 31, wherein:
the system comprises an eye tracking system;
the generating the arrangement signal, via an eye tracking system, is by tracking a gaze of a user amongst the n×m array of client devices; and
each n times m encoded formation identification stream is configured to instruct the respect one of the n×m array of client devices to display the image to lead the gaze of the user.

35. The non-transitory, computer-readable media of claim 31, wherein:
the system comprises a microphone;
the generating the arrangement signal is via the microphone;
each n times m encoded formation identification stream is configured to instruct the respective one of the n×m array of client devices to display the image prompting a respective vocal response by the user; and
wherein the arrangement signal is based on the sum of the vocal responses by the user.

36. The non-transitory, computer-readable media of claim 31, wherein:
the system comprises a user interface;
the generating the arrangement signal is via a user interface;
each n times m encoded formation identification stream is configured to instruct the respective one of the n×m array of client devices to display the image prompting a respective user interface response by the user via the user interface; and
wherein the arrangement signal is based on the sum of the user interface responses by the user via the user interface.

* * * * *